United States Patent [19]

Wand et al.

[11] Patent Number: 4,940,925

[45] Date of Patent: Jul. 10, 1990

[54] CLOSED-LOOP NAVIGATION SYSTEM FOR MOBILE ROBOTS

[75] Inventors: Martin A. Wand, Plano; Anh V. Ho, Dallas, both of Tex.; Chuan-Fu Lin, Westboro, Mass.; Phen-Lan Huang, Richardson, Tex.; John P. Williston, Plano, Tex.; Haradon J. Rice, Plano, Tex.; Thomas J. Doty, Dallas, Tex.

[73] Assignee: Texas Instruments Incorporated, Dallas, Tex.

[21] Appl. No.: 265,196

[22] Filed: Oct. 31, 1988

Related U.S. Application Data

[60] Continuation-in-part of Ser. No. 129,914, Dec. 4, 1987, which is a division of Ser. No. 771,379, Aug. 30, 1985.

[51] Int. Cl.$^5$ ............................................. B62D 1/00
[52] U.S. Cl. ...................................... 318/587; 318/580; 364/443
[58] Field of Search ............... 318/580, 587; 901/1, 901/50; 364/424.01, 424.02, 443, 444, 447, 448, 450

[56] References Cited

U.S. PATENT DOCUMENTS

| 4,750,123 | 6/1988 | Christian | 364/424.02 |
| 4,773,018 | 9/1988 | Lundstrom | 364/443 |

FOREIGN PATENT DOCUMENTS

| 57-64818 | 4/1982 | Japan | 318/587 |
| 60-89213 | 5/1985 | Japan | 318/587 |
| 61-03210 | 1/1986 | Japan | 318/587 |
| 61-134812 | 6/1986 | Japan | 318/587 |

OTHER PUBLICATIONS

"Journal of Robotic Systems", Beni et al, Editors, 3(1), 5-17 (1986), John Wiley & Sons, Inc. 1986.

Primary Examiner—Bentsu Ro
Attorney, Agent, or Firm—B. Peter Barndt; James T. Comfort; Melvin Sharp

[57] ABSTRACT

A visual navigation system provides absolute position information to multiple automatically guided vehicles (AGVs) such as mobile robots. The beacon-equipped AGVs emit light visible to overhead television cameras. The beacons are arranged and controlled so that the vision systems can acquire, measure, and report the locations of multiple AGVs. The system controller incorporates a programmable "factory map", or knowledge base, of allowable paths of travel for the AGVs, which navigate by dead reckoning with periodic position updates from the visual navigation system. The visual navigation system notifies the autonomous AGVs and the system controller when an AGV strays from its command path. The combination of computer controls in the elements of the system provides the means to stop and to recover straying AGVs. The navigation system visually monitors normal AGV travel, off-course corrections, "lost" AGV searches, and recovery. Thus, it provides closed-loop, servo-like operation.

10 Claims, 37 Drawing Sheets

NODE LIST FOR VEHICLE 36: 38 + 39 + 40 + 41
NODE LIST FOR VEHICLE 37: 43 + 42 + 40 + 44
(all references are to Figure 9)

CLOSED-LOOP NAVIGATION SYSTEM FOR MOBILE ROBOTS

This Patent Application is a continuation-in-part of U.S. Pat. Application Ser. No. 129,914 Filed on Dec. 4, 1987, which is a divisional of U.S. Pat. Application Ser. No. 771,379 Filed on Aug. 30, 1985, which is incorporated by reference hereby.

RELATED U.S. PATENT APPLICATIONS

This invention is related to the following U.S. Pat. Applications, assigned to Texas Instruments Incorporated, and all filed on Aug. 30, 1985 which by reference are incorporated herein: Ser. Nos.: 771,397; 771,433; 772,061; 771,380; 771,432; 771,431; 772,280; 771,422; 771,443; 771,322; 771,379; 771,329; 771,459; and 771,545.

This invention is related to the following U.S. Pat. Applications, assigned to Texas Instruments Incorporated, which by reference are incorporated herein, Ser. Nos.: 222,322 (filed on Jul. 20, 1988); 195,345 (filed on May 12, 1988); 129,914 (filed on Dec. 4, 1987); 909,737 (filed on Sept. 19, 1986); and 191,834 (filed on May 9, 1988).

BACKGROUND OF THE INVENTION

1. Field of the Invention

This invention relates to guidance and control methods for automatically guided vehicle (AGV) systems such as mobile robots and more specifically to methods for coordinating the motion of free-roving vehicles by closing the control loop between stationary control computers and mobile control computers.

2. Related Art

Automatically guided vehicle (AGV) systems typically use a guidance scheme which allows the vehicles to travel only forward or backward along a fixed path. This path normally is defined by a guide wire buried in the factory floor, as disclosed in U.S. Pat. No. 4530056. Such a scheme requires elaborate installation methods, as disclosed in U.S. Pat. Nos. 4554724 and 4562635. Alternative AGV guidance and control methods have included means of detecting markings along an AGV's path, such as the methods described in U.S. Pat. Nos. 4593238 and 4593239. Still other methods require a scanner-equipped AGV to follow an ultraviolet-reflective stripe painted on the floor. More recent technological developments have included methods using rotating laser-optical tracking wherein coded reflective tags are placed at points along allowable routes and AGV-based systems illuminate and observe these tags, using conventional triangulation to determine the AGV's position. Inertial guidance methods have many advantages, but in the final analysis still require periodic absolute position updating by such means as those described. All these prior methods involve installing either a continuous physical guide means or physical guide targets throughout the factory, either on or in the floor or on or adjacent to machines, load stations, critical points, or the like. Even where the AGVs incorporate on-board dead reckoning capabilities, these schemes make AGV systems difficult or time-consuming to install, program, or modify.

Significant operational problems also plague systems with existing guidance schemes. For example, dead spots (areas where physical obstructions obscure the guide markers or electrical interference hinders radio or wire-guided communications) can cause loss of AGV control. Grid-lock or deadlock also can occur in wire-guided systems where one AGV "dies" and other AGVs can't pass it, or where two AGVs approach an intersection from different directions.

Texas Instruments designed and reduced to practice a more autonomous guidance arrangement (described in U.S. patent application Ser. No. 771,397 discussed above) which used a form of visual navigation system to update the position references of AGVs equipped with automatic dead reckoning ability. That system incorporates the means to view multiple independently guided and steered AGVs operating within the same environment without physical path constraints. The AGVs in that system incorporate on-board dead reckoning guidance. The visual navigation system disclosed herein acts to close the guidance servo loop by providing the AGVs with periodic absolute position updates.

The only constraints on the AGVs in this scheme are that they be operative and visible (their beacons must be lighted and they must be within the field of view of any of the system guidance cameras). Such a system is superior to prior art in a number of ways: no guide strip or implanted wire need be installed in or on the factory floor; the AGVs are not constrained to one- or two-directional movement but can be free-roving; the AGV pathways are readily reprogrammable.

The TI Visual Navigation System disclosed in U.S. patent application Ser. No. 771,397 operated without any knowledge of where the AGV should be. It used the method that at any instant when the vision system was taking a picture, there was only the AGV of interest whose light beacons turned on. Therefore, the lights captured by the vision system at that instant must be the AGV of interest. It then computed each light's centroid and transformed all 3 centroids from camera (image-plane) coordinates to factory floor coordinates. Using the stored triangular shape and dimension to determine the AGV's position and orientation, the vision system passed this data through the communication link (described in U.S. patent application Ser. No. 771,322) to the AGV to provide feedback to allow the AGV to compensate for inaccuracies in the dead-reckoning. The AGV dead reckoning and position update method is described in U.S. patent applications Ser. Nos. 771,321 and 771,432.

Since the system did not know the intended path of the robot, several problems could occur:

1. The vision system could not know whether an AGV was "on course" because the navigation software had no knowledge of the "course," or intended path. The method disclosed in U.S. patent application Ser. No. 771,329 included a path-predicting technique which could only indicate a best-guess estimate of the next camera to use for a search, assuming the navigation system could identify confidently the AGV's current position. The method did not include a path-planning technique.
2. The number of AGVs the vision system could navigate simultaneously was limited because the amount of message traffic required to properly identify one individual AGV among many was large.
3. The navigation system's speed was limited by lack of knowledge of an AGV's intended path. This method, disclosed in U.S. patent application Ser. No. 771,459, required an ever-increasing radius of search (called rings of uncertainty) when an AGV left a camera's field of view. In a worst case, this could include the entire collection of cameras.

4. Scanning entire fields of view could result in processing insignificant lights, reflections, glare, or lights from the wrong AGV (in case of communication failure). The method disclosed in U.S. patent application Ser. No. 771,380 was used to discriminate between beacon images and extraneous images such as reflections. Even with this "filtering" technique, the image processing windows of the original scheme were so large that AGVs had to remain separated by a wide margin because of the possibility that at least one light of an AGV might intrude into a picture of another, confusing the navigation software.

5. Lack of knowledge about intended motion prevented determining AGV orientation if an AGV light were blocked, as shown in FIG. 1. Previous techniques disclosed in U.S. patent application Ser. No. 772,061 required all of an AGV's lights to be visible to determine orientation. An on-board robot arm or payload obstructed at least one beacon at least 50 percent of the time. The means of determining the location of an obstructed beacon was extrapolation based on knowledge of its most recent known position. AGV control was erratic when robot arms were mounted to the payload area. Any opaque object taller than the beacon mounts could obstruct any or all of the beacons and prevent proper navigation.

6. Positional repeatability suffered because lack of knowledge about nodes in the allowable paths allowed an AGV to approach a given node covered by more than one camera from any direction. To control repeatability, it is desirable to park at a given point always using the same camera.

Summary of the Invention

The invention addresses these problems by providing (1) the factory knowledge base to the vision system, by providing (2) a dynamic "window" which is slightly larger than the AGV but smaller than the maximum allowable path width in the direction of travel, and by providing (3) three different types of "zones" within and around a path.

1. The system controller sends the factory map, with its knowledge of all allowable AGV pathways, camera assignments, and node assignments, to the vision system when the navigation system requests it. This tells the navigation system the location of cameras and nodes within the factory. The navigation system determines the location of the AGVs by processing the beacon images, by computing the centroid of each AGV, and by comparing the centroid with "zones" of travel defined for the AGVs.

2. The navigation system now knows which camera's field of view to check for an AGV at any given time. This greatly decreases the time required to locate an AGV when it leaves a node, thus allowing a larger number of AGVs to operate simultaneously with the navigation system.

3. Now that the vision system contains the factory map, the time required to locate an AGV when it leaves one camera's field of view is greatly reduced. In fact, the navigation system knows not only the absolute position of an AGV of interest, but also the nodes through which it must pass on its way to its intended destination. It therefore knows the camera numbers it should search for the AGV. The software is optimized so that the navigation system normally scans only the camera number under which the AGV is supposed to be traveling at the time of the scan. When the AGV leaves one field of view, the navigation system knows which single camera to scan next, and so forth. It only becomes necessary to scan multiple cameras when an AGV leaves its intended path or when a disabled AGV is enabled. Since the navigation system no longer scans empty space or multiple cameras unnecessarily, its speed is no longer limited by such time-consuming searching.

4. A dynamic image-processing window solves the problem of scanning unrelated lights, reflections, glare, or lights from the wrong AGV. The window corresponds to a processing area only slightly larger than the AGV itself, thus completely excluding the possibility that another AGV can intrude into the image processing area. This also excludes reflections from nearby objects.

5. Now that the navigation system knows where to look for a particular AGV, what direction the AGV was traveling at the last position update, and what its orientation should be, it is possible to navigate an AGV even though its beacons may be partially blocked, as shown in FIG. 1. This is an important improvement because AGVs carrying on-board robot arms or high payloads have at least one beacon blocked at least 50 percent of the time.

6. Positional repeatability is improved at machine nodes (where the AGVs dock) because the navigation system always uses the same camera for parking when more than one camera's field of view overlaps at the node, as shown in FIG. 2. This means that all AGVs which dock at a given node will use the same camera regardless of how they approach the machine node.

Terms Used In Describing the Invention

The following descriptions of the invention incorporate several key terms including: factory coordinates, the "factory map," nodes, path segments, image-processing "windows," uniquely identifiable AGVs, and AGV "states."

The physical operating environment of the invention is assumed to be a factory. When the AGV system is installed in the factory, the system operators select an arbitrary physical marker as the "factory origin." Using measuring tapes or surveyor's equipment, the location of each camera, each machine, and each node is determined and then entered into the system computers as the "factory map." A node is a specific location (in factory-floor coordinates) in the factory. Factory-floor coordinates are positions in Cartesian coordinates, using the factory origin as the point (0,0). The units of measure are feet (in decimal notation, as 10.5 feet rather than 10 feet 6 inches).

A node is usually taken to be the center of a specific camera's field of view, but one camera may view several different nodes, depending upon the layout of machines and pathways in the factory. A node is placed at each machine to be serviced, at each place in the factory where an AGV may need to be parked (servicing areas, battery-charging stations, and the like), and at any point in the factory where AGVs routinely may be required to turn or rotate. When a node is defined, it also is identified with the camera which can "see" it.

Path segments connect each adjacent pair of nodes. For example, a path segment consists of a starting node, an ending node, and all the "empty" (i.e., nonassigned) space in between. Rather than directing an AGV to travel from one node to another, the system controller "reserves" for the AGV the path segments which connect the two nodes. This allows the system to prevent collisions and deadlocks.

"Windows" are the areas of a camera's field of view which are processed by the computer vision system to locate light "blobs." These light blobs represent either AGV navigation beacons or extraneous light sources (such as machine lights, reflections, and the like). Since accurate navigation requires confident location of navigation beacons, all extraneous blobs must be eliminated. The invention accomplishes this by processing only those blobs which occur within the window defined for a given AGV. The windows are defined so as to be just large enough to include the AGV.

While it is being tracked, an AGV is individually identifiable by the distances between its navigation beacons. For each AGV, there are four possible right triangles which may be formed by chords drawn between three of its four beacons. When an AGV is first introduced into the system, an operator "teaches" the system to recognize the AGV. The teaching process is to park the AGV under a camera and answer prompts from the visual navigation system's program to identify each of the lights. This process creates a data base for the AGV which includes the length of each of the six possible chords and the perimeter of each of the four possible triangles. This technique allows the visual navigation system to determine an AGV's identity and orientation during tracking.

When a critical search is in progress, the invention incorporates an additional means of identification, which is to command the target AGV and only the target AGV to illuminate its beacons.

Since the AGVs are semi-autonomous, any decision the visual navigation system makes concerning an individual AGV requires knowledge of what the AGV is doing at the time. To facilitate this, a number of possible "states" (such as dead, critical, suspicious, OK, enabled, reset, etc.) are defined for the AGVs. When the system queries an AGV, or when the system controller passes status information to the visual navigation system on demand, the message includes a "status bit" which indicates the AGV's current state. This technique helps avoid such problems as commanding an AGV to stop when, in fact, it isn't moving, or continuing a search even though the target AGV already has been found, and the like.

DESCRIPTION OF THE PREFERRED EMBODIMENTS

Figure 3:
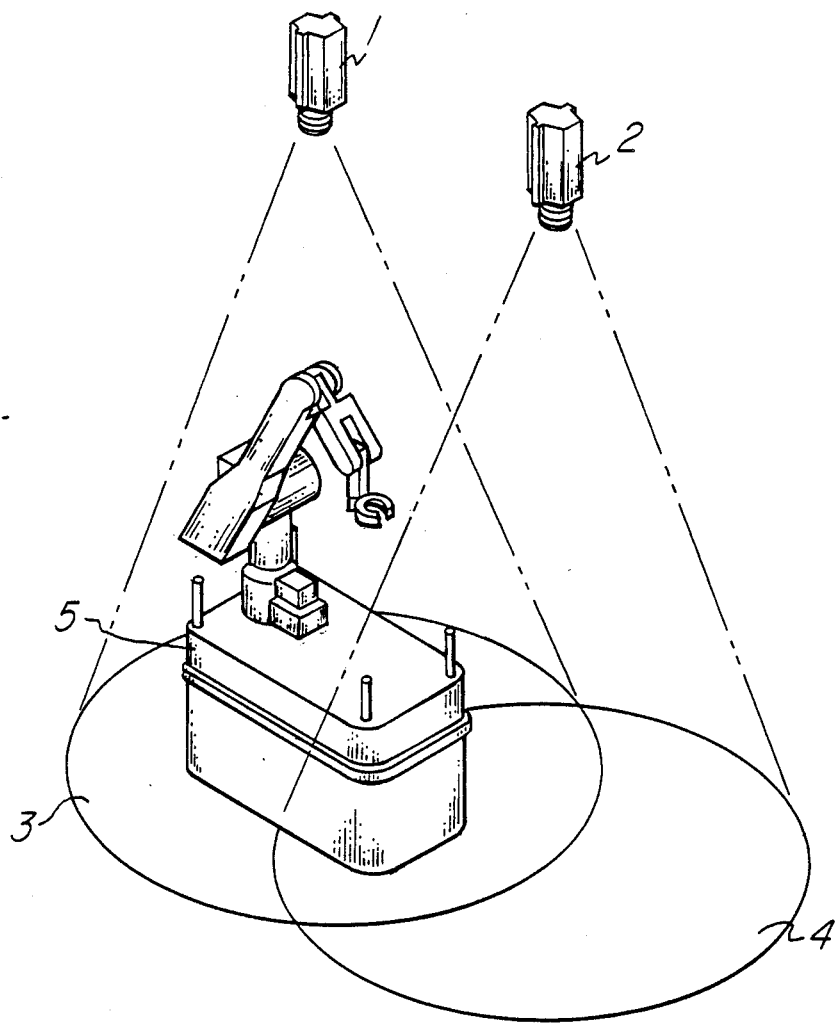
FIG. 3 is a representation of the invention in use in a typical factory setting, showing the navigation system's overhead cameras viewing an AGV approaching a node.
Figure 7:
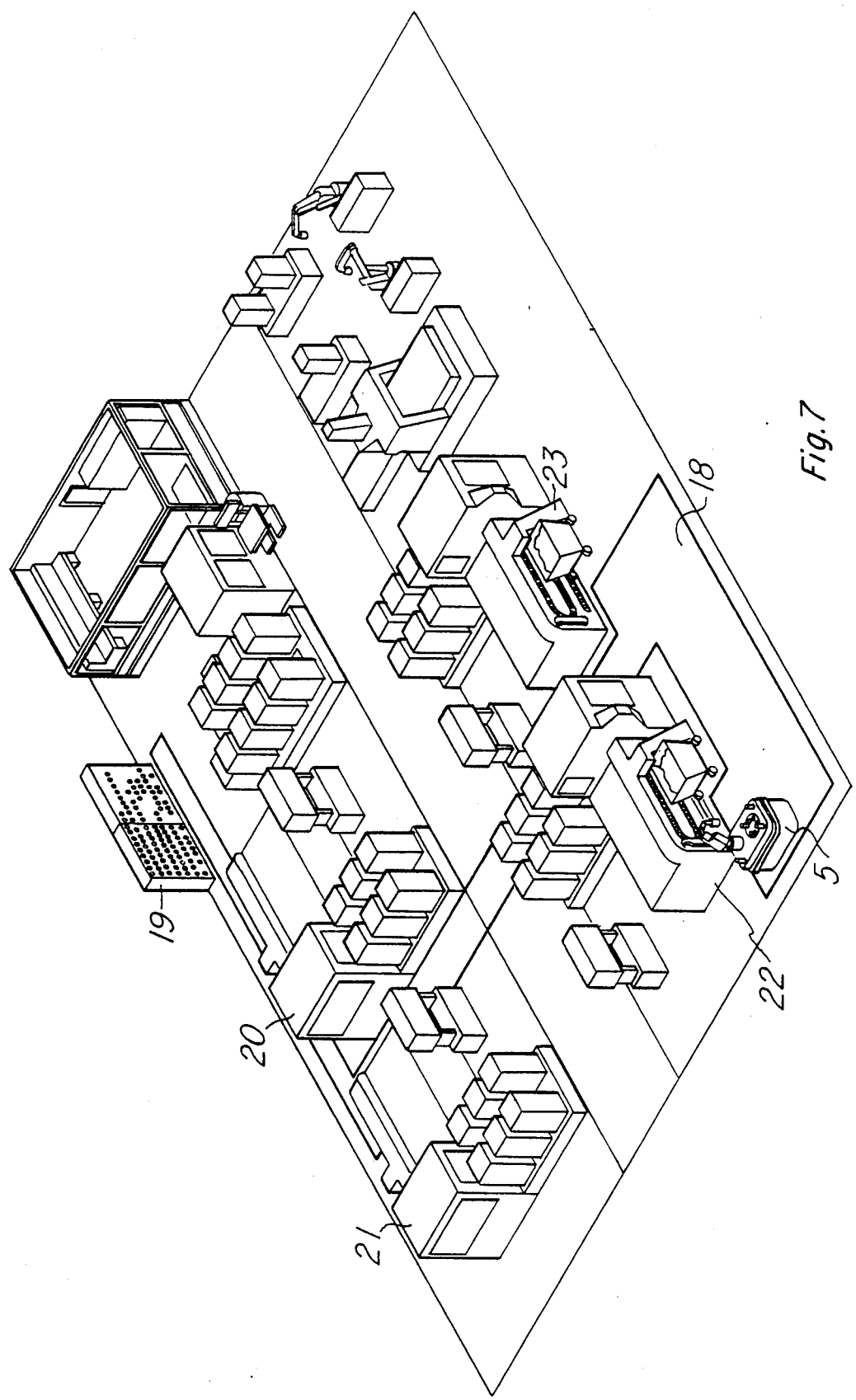
FIG. 7 is a representation of a factory floor plan with the invention in place, showing the AGV pathways and the free-standing machines they service.
Figures 9, 10:
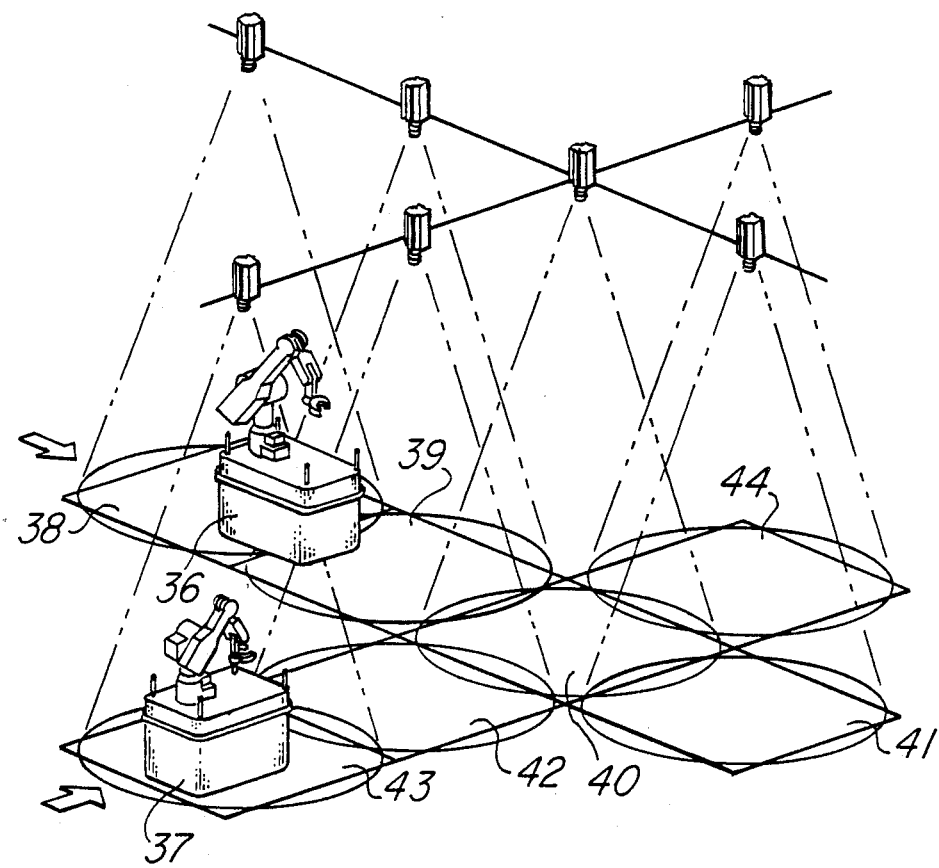
FIG. 9 is a representation of the collision-avoidance method which is based on node lists and pathway supervision.
FIG. 10 is a representation of the node lists for the two AGVs shown in FIG. 9, showing the node of possible contention (collision).

The preferred embodiment, shown in FIGS. 3, 7, and 9, uses downward-aimed television cameras 1, 2 to view a factory from above. The cameras are situated so that fields of view 3, 4 include all paths along which AGVs 5, 36, 37 are to be allowed to travel. Points of interest (such as machines or load/unload stations) along these routes are designated nodes and are assigned descriptions in the navigation system software.

Figure 4:
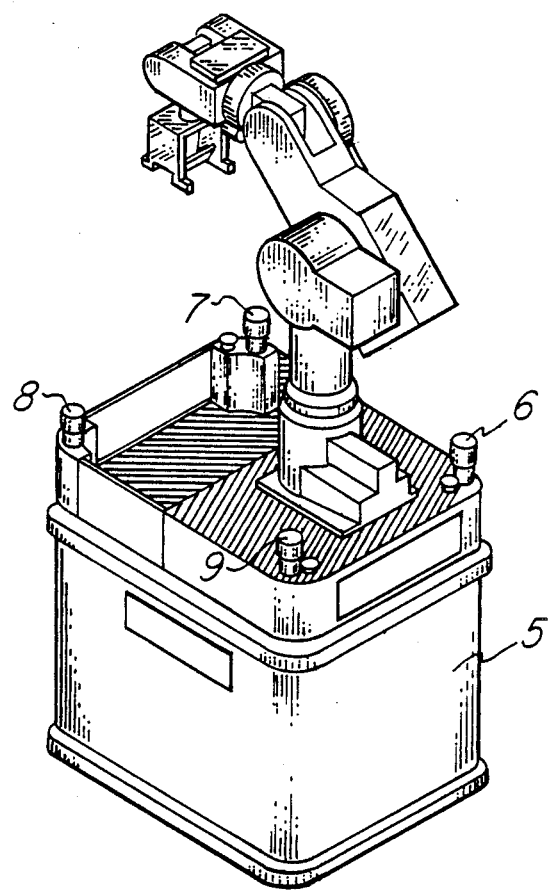
FIG. 4 is an illustration of an AGV, showing the navigation beacons which are viewed by the navigation system.

Each AGV is equipped with several navigation beacons, as shown in FIG. 4. This assures that at least two beacons (FIG. 4, items 6, 7, 8, 9) always are visible.

The visual navigation system is calibrated to determine the correspondence between physical distance in the plane formed by AGV navigation beacons and physical locations in the factory (factory-floor coordinates).

Figure 5:
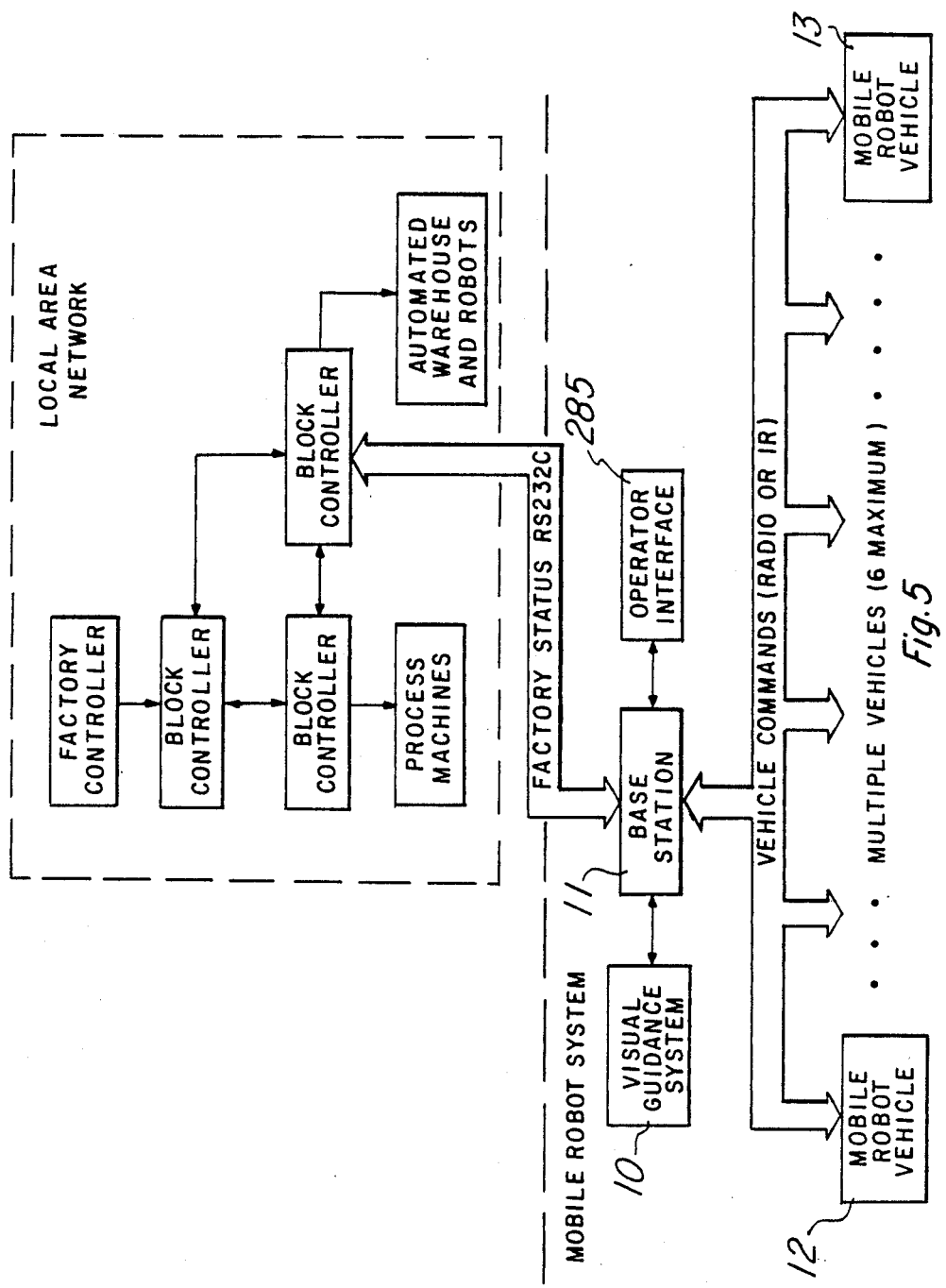
FIG. 5 is a functional schematic diagram of the navigation system's communication links.

As shown in FIG. 5, the visual navigation system 10 can communicate with the system controller in the base station 11 and multiple AGVs 12, 13, individually or as a group, via a communications controller also located in the base station. The working model of the system described herein controls from one to six AGVs simultaneously.

Figure 6:
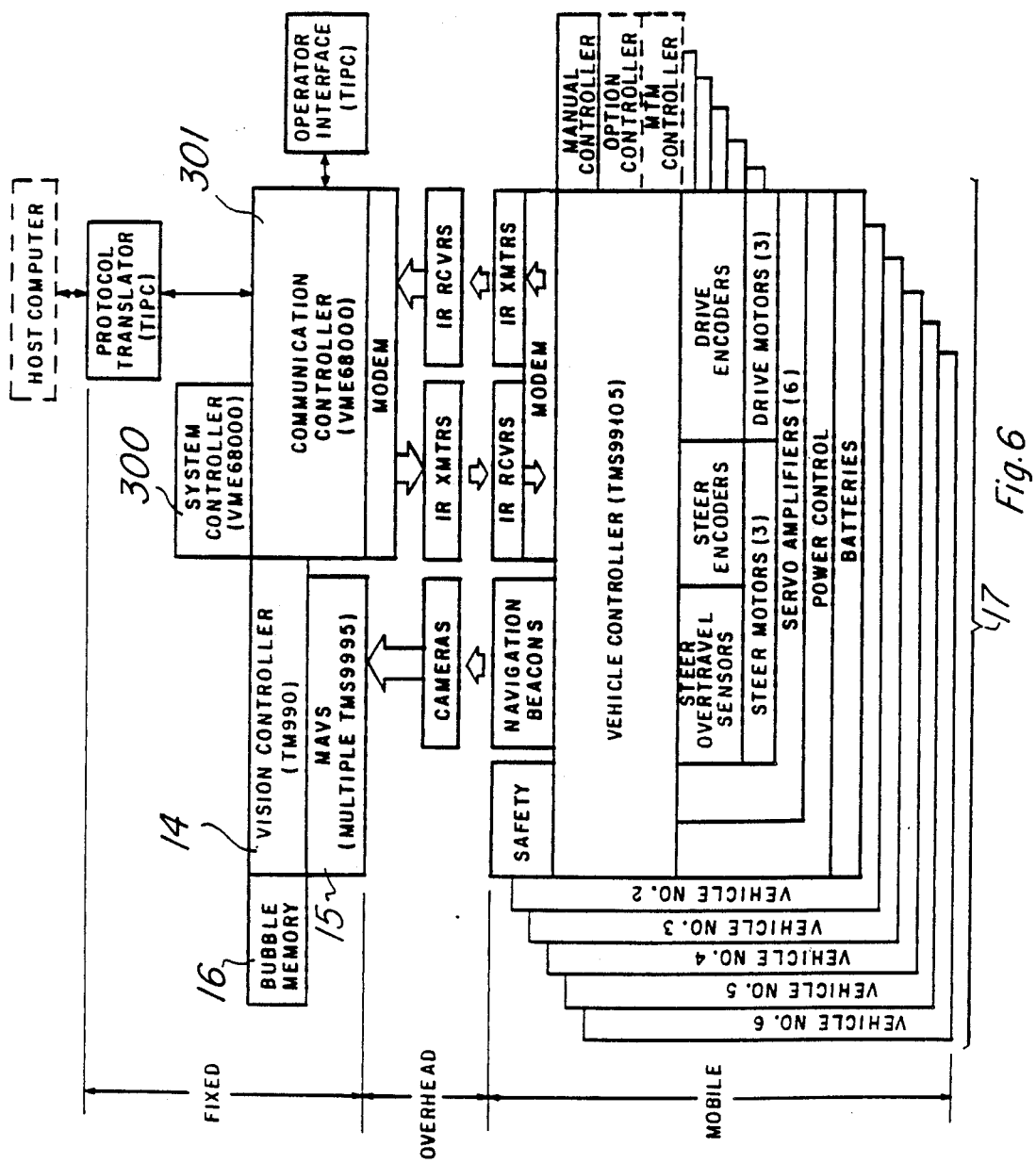
FIG. 6 is a block diagram showing the electrical and electronic components of the navigation system.

The visual navigation system 10 includes, as shown in FIG. 6, a central processing unit or vision controller 14, an image processing unit 15, and sufficient memory 16 to acquire, process, and store video images adequate to control the navigation of the AGVs 17.

A web of allowable paths 18, FIG. 7, is defined using a computer 285 and a program which assigns the individual path segments to the factory space. This "factory map" is stored and is delivered to the system controller 300, FIG. 6, via the communications controller 301. On request of the visual navigation system 10, the system controller 300 provides the factory map. Each machine 19-23, FIG. 7, is assigned a node number so that its place in or along a path 18 can be identified individually. Each camera which looks down on the factory has a limited field of view. Sometimes, as in FIG. 2, the field of view 3 of one camera 1 overlaps 24 part of the field of view 4 of another 2, or includes several complete nodes. Each node, however, is assigned to one and only one camera to improve docking repeatability. The factory map includes all this information.

Figure 8:
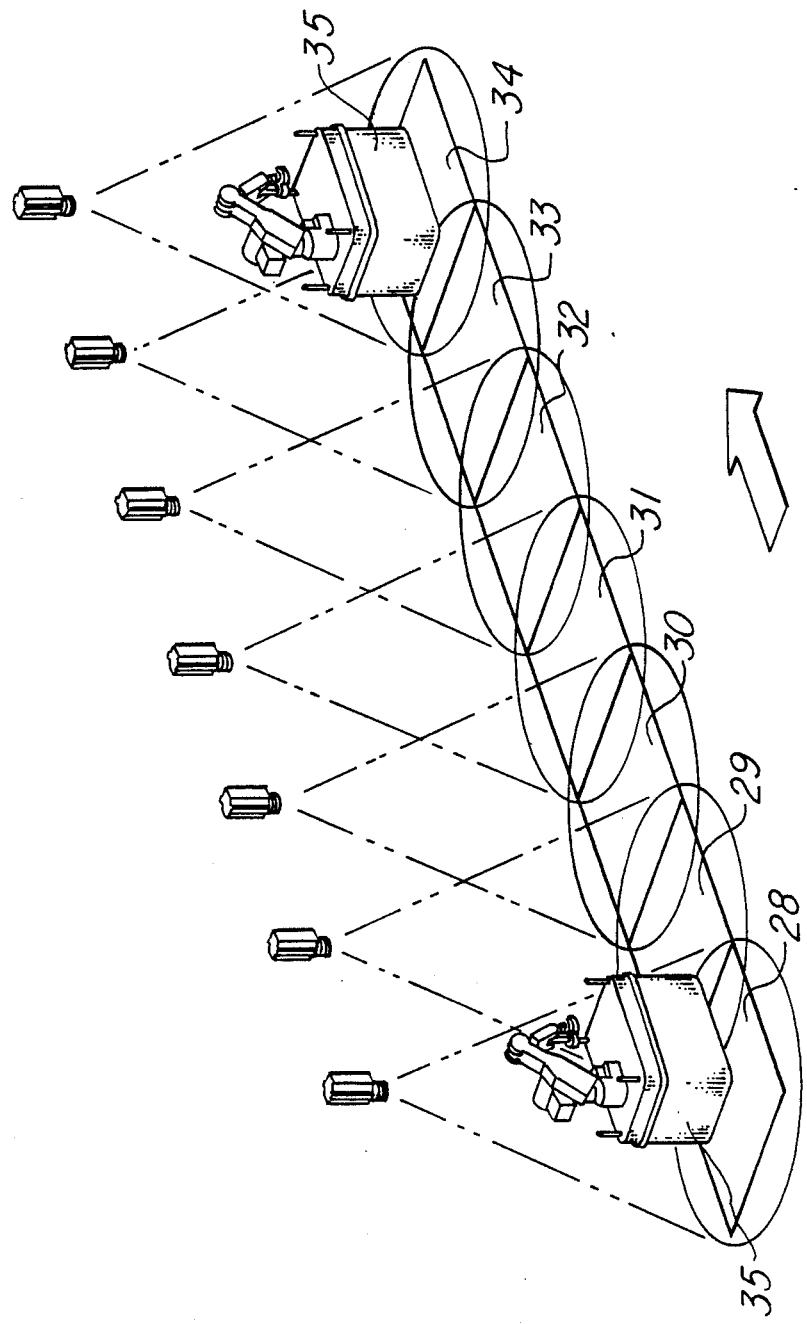
FIG. 8 is a representation of the manner in which nodes, node lists, and camera number assignments relate to the physical reality of pathways and AGVs.

The method for predicting next position is based on the knowledge of nodes and camera assignments. The system controller shown as 300, FIG. 6, includes a routing program which determines the nodes through which a given AGV must pass on its way from its origin 28 to its destination 34, as shown in FIG. 8. Once the system controller determines an AGV's route, as in FIGS. 9 and 10, nodes are reserved (in short lists) for a particular AGV 36 or 37. This maximizes access to pathways while simultaneously minimizing the possibility of collisions. Each node list is unique.

For example, as shown in FIGS. 9 and 10, the intended path for an AGV 36 is the node sequence 38+39+40+41. Another AGV 37 may have reserved the path defined as the node sequence 43+42+40+44. The system controller resolves any potential conflict at node 40 by assigning it to only one AGV at a time. Therefore, if one AGV 36 is to be granted right of way through node 40, the other AGV's 37 node assignment list would include only nodes 43+42 until the first AGV 36 clears node 40. In actual practice, the invention has been used successfully with as few as three nodes per list. The lower limit of node list length is determined by the lengths of the AGVs and the distance between the nodes. If an AGV is so large that it can simultaneously occupy any two nodes, the smallest practical list size is three nodes per list. Three nodes define two path segments; two path segments (minimum) are needed to define a complete path because in many cases an AGV is large enough to occupy two nodes simultaneously; therefore a two-node list would in some cases be ambiguous.

For this or any other such closed-loop, servo-like control scheme to work, it is important to know the location of each AGV in factory-floor coordinates. In typical AGV systems, such knowledge is limited to certain small and isolated areas of the factory (the cross-wire sites, the hash marks painted on the floor, or the location of bar code markers, etc.). These sites are physically fixed, i.e., nonprogrammable. In such systems, true point-to-point travel is not possible because in order to travel between two widely separated points (arbitrarily, Point A to Point n) an AGV must pass through all intervening points in sequence. The invention described here solves this problem by implementing programmable pathways so that an AGV can travel directly from any point to any other point (as in the foregoing example: Point A to Point n) through any possible sequence of other points, i.e., via a programmable (not physically fixed) path.

Figure 11:
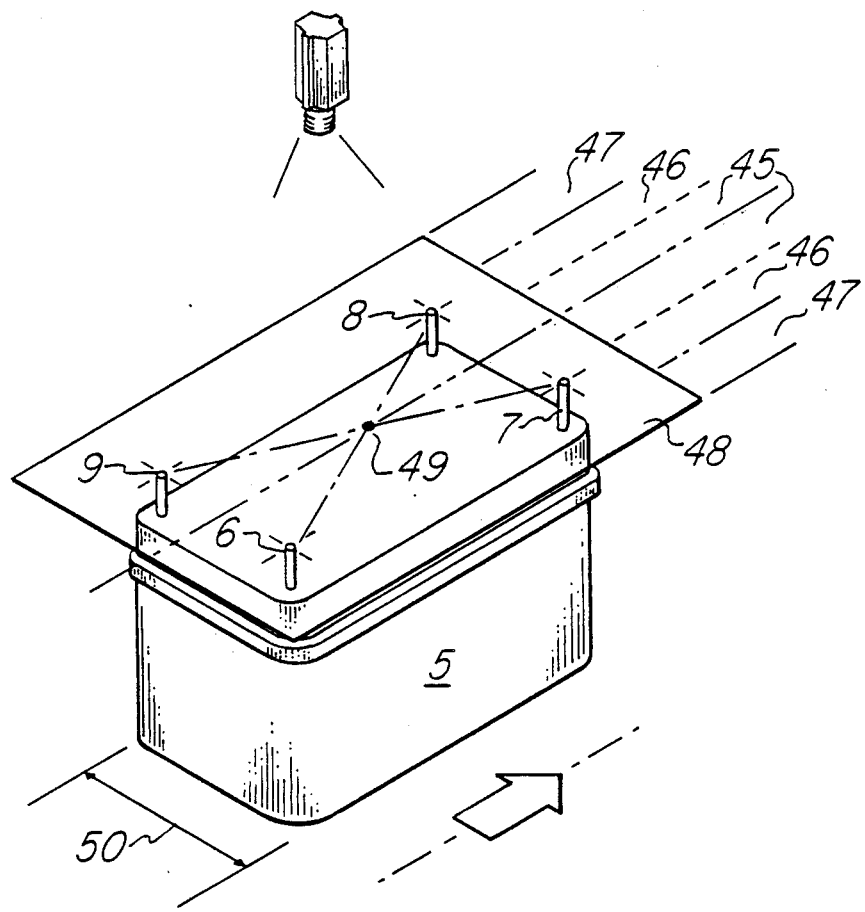
FIG. 11 is an overhead view of an AGV in a pathway with allowable zones of travel and dynamic window depicted in relation to the AGV's size and orientation.

To provide this capability, as shown in FIG. 11, the invention implements a dynamic image-processing window 48 for each AGV and locates AGVs within their processing windows relative to allowable zones of travel along the programmable pathways.

The AGV's orientation in its pathway determines the orientation, shape, and size of the image processing window the navigation system uses to locate the AGV.

As shown in FIG. 11, for a given AGV 5, centered on its axis of travel and parallel to its direction of travel, there are three zones of travel: OK or "legal" 45, suspicious 46, and critical 47. All areas of the factory which lie outside these zones are called "dead zones." An image-processing system, as described in U.S. patent application Ser. No. 771,433, processes the images of the beacons 6–9 for an AGV so the visual navigation system can compute the center 49 of the diagonal formed by beacons in the plane 48 of the beacons and compares this location to the factory map's description of the path and its zones. The dimensions of the zones are calculated percentages of the travel-direction breadth 50 of the AGV, plus a small tolerance figure. If the AGV's center is between the boundaries of the OK zone 45, the navigation system continues routine position updates.

If the AGV's center lies within the suspicious zone 46 along either side of the OK zone, the navigation system's position update contains data which causes the AGV to stop when the AGV receives the update.

If the AGV's center lies within the critical zone 47 along either side of the suspicious zone, the visual navigation system's position update includes data which causes the system controller, shown in FIG. 6 as 300, to tell all AGVs in the system to stop.

Since one advantage of the invention is to allow omnidirectional AGV motion, both the image-processing windows and the zones of travel must be dynamic. This is particularly important when an AGV is turning or is "crabbing" (moving at an angle to either its long or short axis).

The invention comprehends these difficulties by implementing the long axis of the window parallel to the long axis of the AGV and by implementing the centerline of the OK zone of travel parallel to the AGV's heading and through the center of the diagonal formed by the images of the corner beacons, shown in FIG. 11 as 6, 7, 8, and 9.

The window must retain the AGV's shape to preclude the possibility of including an extraneous light (reflection, machine light, or beacon from the wrong AGV) as part of the image of an AGV. Therefore, the window's axes parallel those of the AGV regardless of the motion of the AGV except when the AGV is rotating (in which case the window is circular). These omnidirectional AGVs may rotate about their center, shown as 49 in FIG. 11, about any other point on the AGV, or about any point on the factory floor. However, for the sake of convenience in this discussion, rotation as shown in the figures is taken always to rotation about the AGV center 49 exactly at a node. For example, the case shown in FIG. 37 has the AGV first rotating at node N1, then moving laterally to node N2. While the AGV is rotating, the image-processing window 303 must be circular so as to enclose all the navigation beacons regardless of orientation. While the AGV is moving laterally, the image processing window 302 is rectangular, so as to exclude the lights of machines and other AGVs, as shown in FIG. 11 at 48.

The zones of allowable travel must relate to an AGV's heading. The case shown in FIG. 11 is simple straight-line motion along the AGV's longitudinal axis. The worst case occurs when an AGV is turning or crabbing. In such a case, the zones of travel do not parallel the AGV or window axes, but instead are taken to be parallel to the direction of travel. This is possible because the visual navigation system can locate an AGV and compute its angle of travel. The visual navigation system applies this angle of travel to the calculations which create the allowable zones of travel. When an AGV rotates in place or turns about a node, the image processing window takes the circular shape described in FIGS. 37 and 38 as 303, centered on the AGV's beacon-diagonal center to preclude the possibility of failing to include a significant light (beacon).

Figure 36:
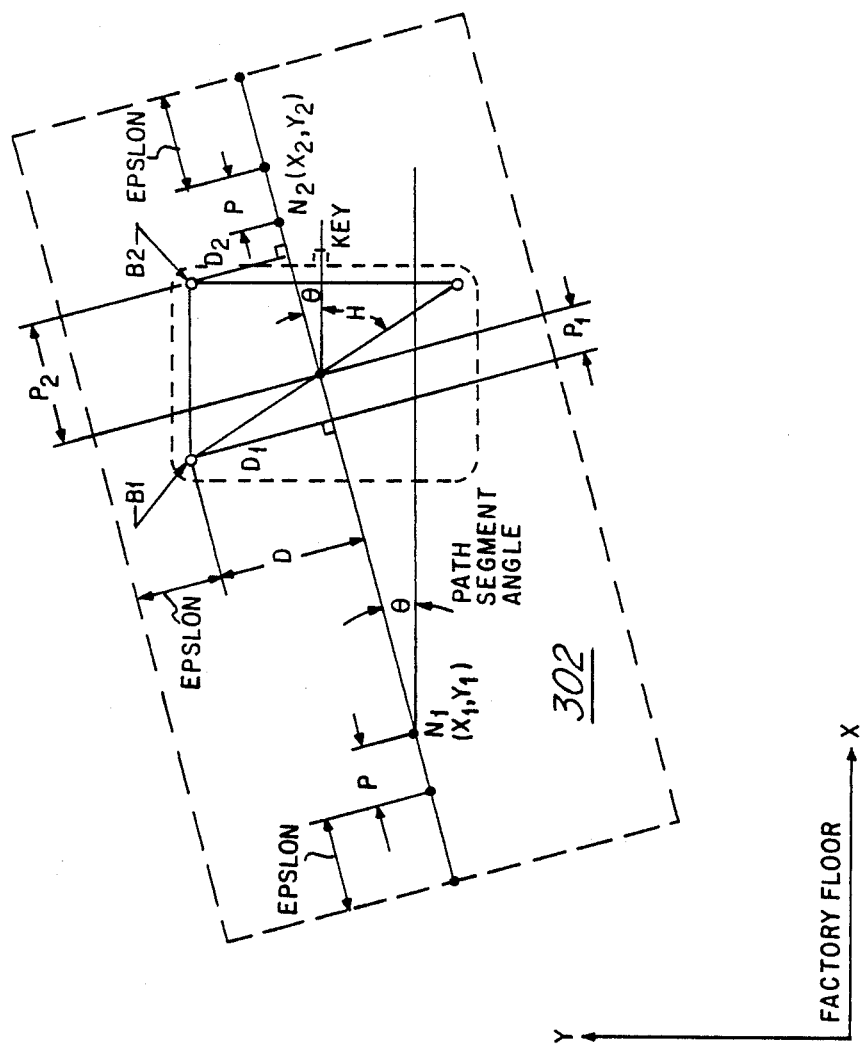
FIG. 36 is a figure showing the geometrical relationships for an AGV within the visual navigation system's image processing window when the AGV is moving from one node to another without rotating at either node.
Figure 37:
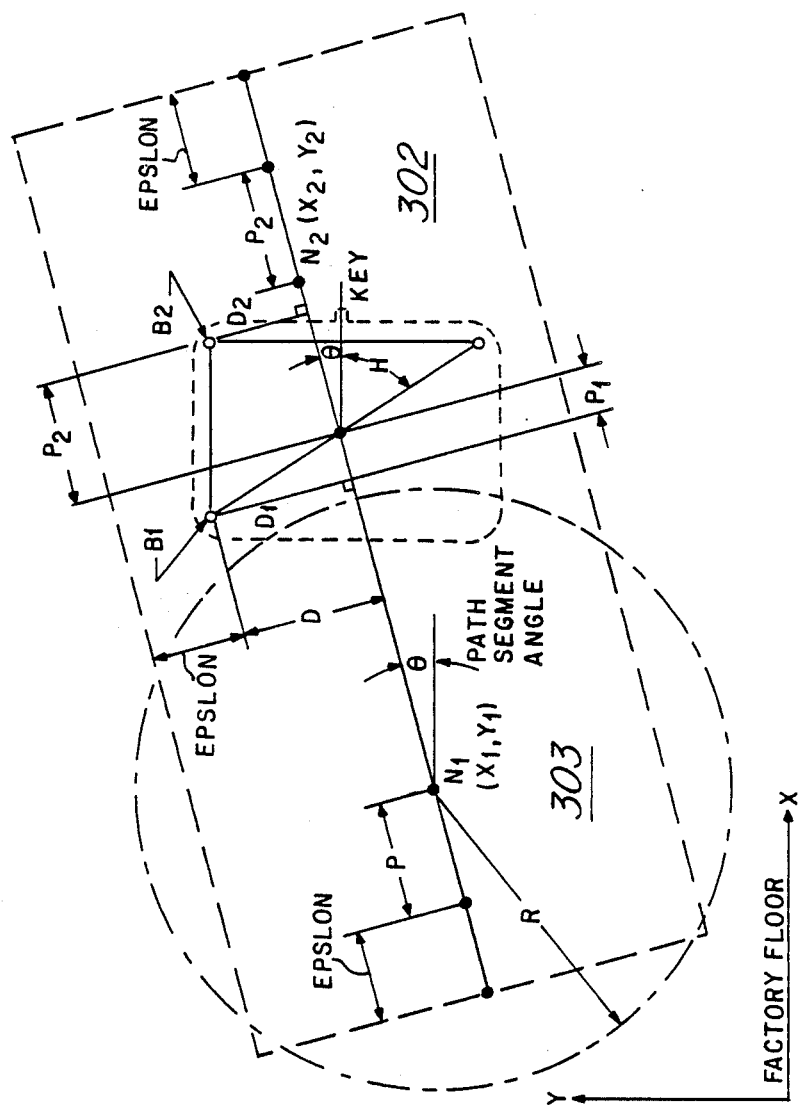
FIG. 37 is a figure showing the geometrical relationships for an AGV within the visual navigation system's image processing window when the AGV is moving from one node to another in the case where the AGV rotates at the first node.
Figure 38:
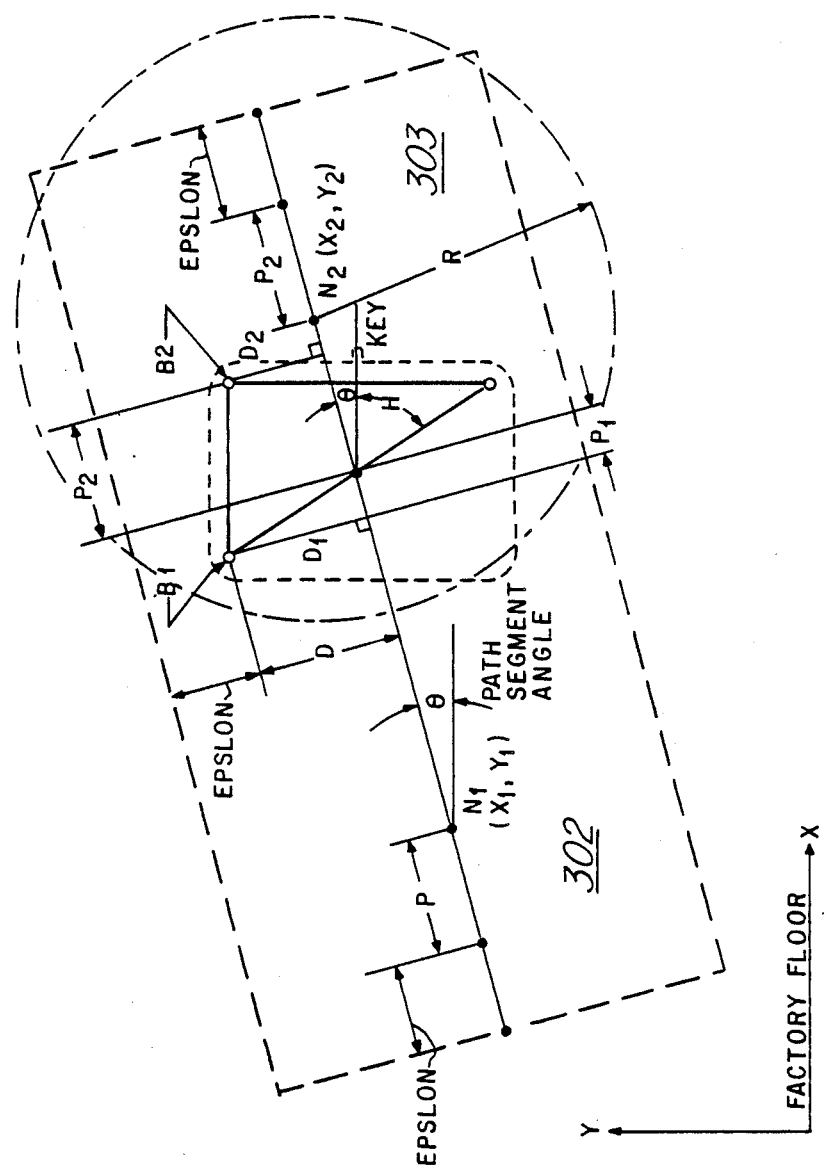
FIG. 38 is a figure showing the geometrical relationships for an AGV within the visual navigation system's image processing window when the AGV is moving from one node to another in the case where the AGV rotates at the second node.

For the sake of clarity in reading the drawings, the image-processing windows 302 and 303 in FIGS. 36, 37, and 38 are exaggerated in size. In practice, they are only slightly larger than the AGVs themselves, as indicated by the geometry in the figures. The design goal is to keep them as small as possible, to avoid longer calculation times for the image-processing algorithms, and yet to make them large enough to allow for irregularities in AGV motion with being so large as to include extraneous light sources.

Figure 27:
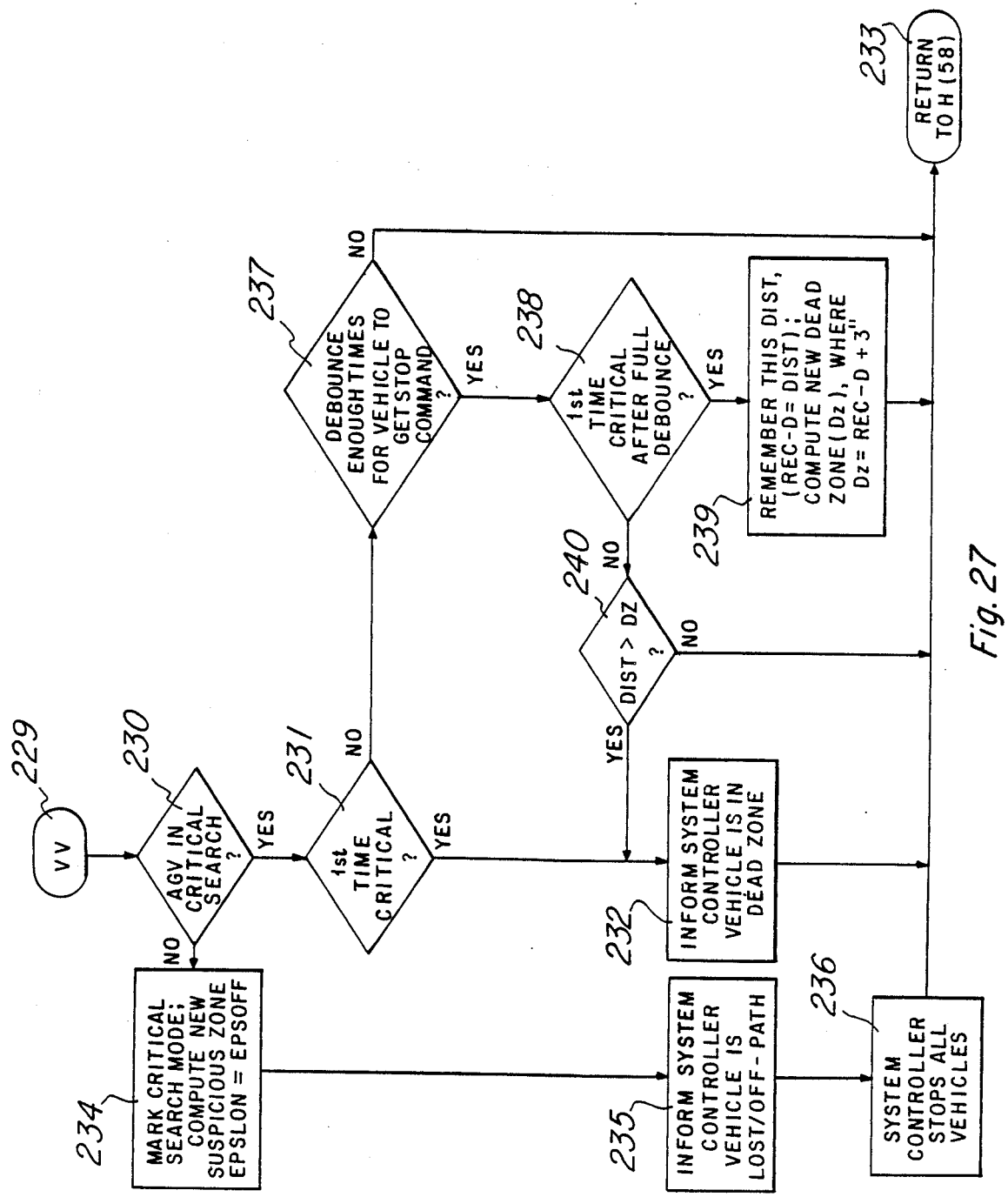
FIG. 27 is a flowchart showing the method the visual navigation system uses to perform a critical search for an AGV, such as when an AGV is reported as "lost."

What happens after an AGV stops, as shown in FIG. 27, depends on whether the AGV stopped because its most recent position update included an off-course flag (shown as the "suspicious flag" 206 in FIG. 24) or because the AGV received an "all stop" message 236 from the system controller 300. In the first case, the AGV is off-course, while in the second it may not be. If on course, a stopped AGV receives a "resume" message from the system controller and continues on its way as soon as the problem which caused the stop message has been resolved. If off course, an AGV which was stopped because the visual navigation system indicated the AGV was in the "suspicious" zone remains stopped until it receives one position update without the suspicious bit set. Then, the AGV starts to move at slower than normal speed until it receives four additional position updates (before resuming normal speed). The technique allows the AGV a chance to recover and return to the path without adversely affecting system performance. The choice of four updates is somewhat arbitrary. In the embodiment described here, this interval provides a good compromise between efficient operation (short recovery time interval) and safety (short distance).

When an AGV moves so far off-course the navigation system can't find it, the navigation system uses the knowledge of the affected AGV's assigned nodes to determine which cameras to use for a directed search. This gives a search which is one-third to one-fourth the duration of that provided by earlier techniques such as described in U.S. patent application Ser. No. 771,459. Also, the dynamic image-processing window is expanded slightly during such "critical" searches to improve the system's ability to recover AGVs without operator intervention.

Individual AGV identification is due to four factors: (a) the navigation system has access to where each AGV is expected to be in the factory map; (b) each AGV's unique beacon configuration is described to the navigation system; (c) the navigation system can request all AGVs except the one of interest to turn their navigation beacons off; (d) the navigation system can request that the AGV of interest turn on or off its beacons individually or in any combination.

For the identification factors described above: (a) controls routine navigation and tracking; (b) also provides information necessary to determine an AGV's orientation; (c) further assists the navigation system in locating "unidentified" AGVs (all AGVs at system start, or those which later stray far off course); and (d) gives the navigation system the ability to identify and track an individual AGV even if one or two of its beacons can't be detected.

Execution of the Control Program

The visual navigation system 10 closes the servo loop between the system control computer 300 and the AGVs 12 and 13 by providing periodic position updates to the AGVs and by informing the system controller if an AGV is straying from its path.

Before the visual navigation system 10 can do these things it needs knowledge of the AGVs' surroundings and a set of rules for determining what to do (where to search and when). The knowledge base is called a "factory map," as described earlier. The rules for searching are incorporated in a control program as shown in FIG. 27 and in the visual navigation system's ability to determine an AGV's intended path.

The flowcharts, FIGS. 12-30, show how the visual navigation system determines and reports an AGV's position, how it determines an AGV's relationship to its intended path, and how it creates and monitors an AGV's zones of travel and image processing windows.

Program Overview

Figure 12:
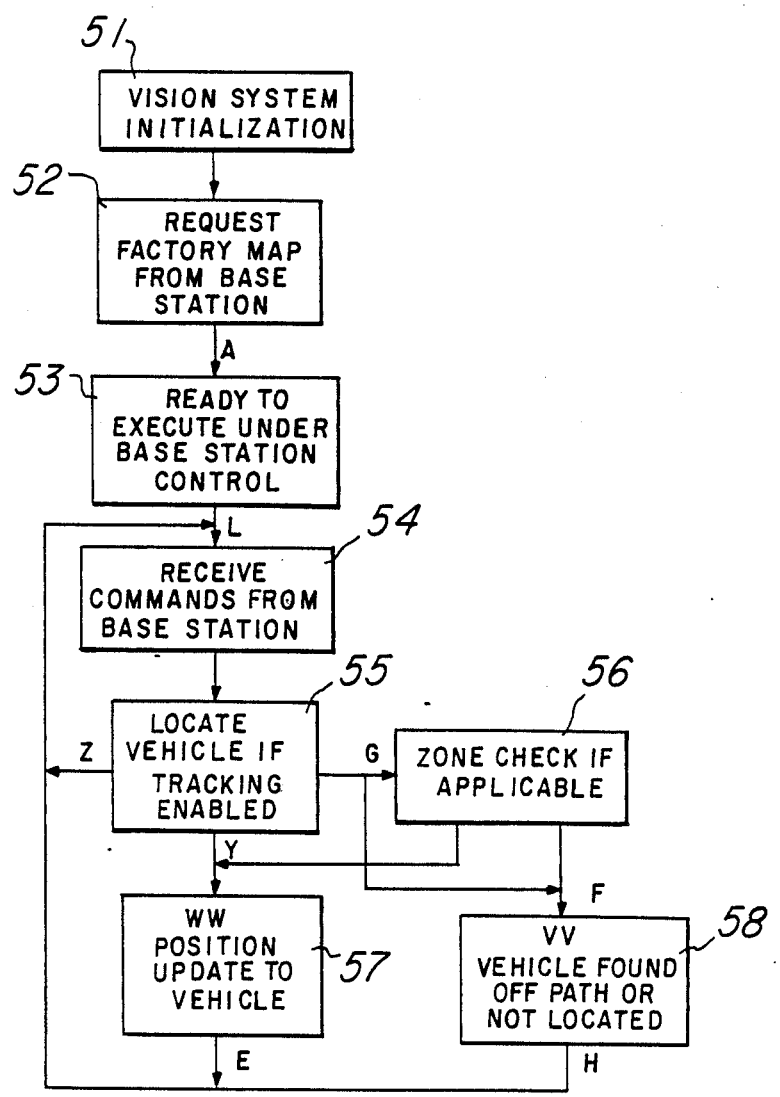
FIG. 12 is a flowchart showing the overall flow of execution of the visual navigation system.

The overview flowchart in FIG. 12 shows the complete sequence of normal operation. When the visual guidance system (10 in FIG. 6) is started 51, the visual guidance system assumes a known initial state and then requests 52 the factory map from the base station. The factory map contains the known operating parameters of the AGV's work environment. This includes such items as the positions of the overhead cameras, the factory floor locations of the machines to be serviced, and the complete description of the node network. Once this information has been received and the visual navigation system 10 is ready to operate 53, it notifies the base station 11 that it is awaiting instructions 54.

Commands from the base station enter the visual navigation system's loop at point L (block 54). Tracking commands cause the visual navigation system to attempt to locate 55 an AGV. If the AGV is found to be on course, the visual navigation system reports the AGV position as at point E (block 57) and loops back to point L to await further instructions. However, if as at point G (block 56) the AGV either can't be located or its position is suspect, the visual navigation system checks to determine 56 the location of the AGV's center relative to the allowable zones of travel. If the AGV is "recoverable" as determined by the zone check 56, the visual navigation system reports the AGV's position and returns to monitoring the factory. The AGV's on-board controller acts on the position report 57 to move back to its proper path. If the AGV is indeed far off its course, as at point F, the visual navigation system launches a critical search 58 which culminates either in locating the AGV or in stopping all AGV motion to allow operators a safe means of determining and correcting the problem.

In normal operation, therefore, the visual navigation system provides a closed-loop, servo-like operation for free-roving multiple AGVs.

The Factory Map

Figure 13:
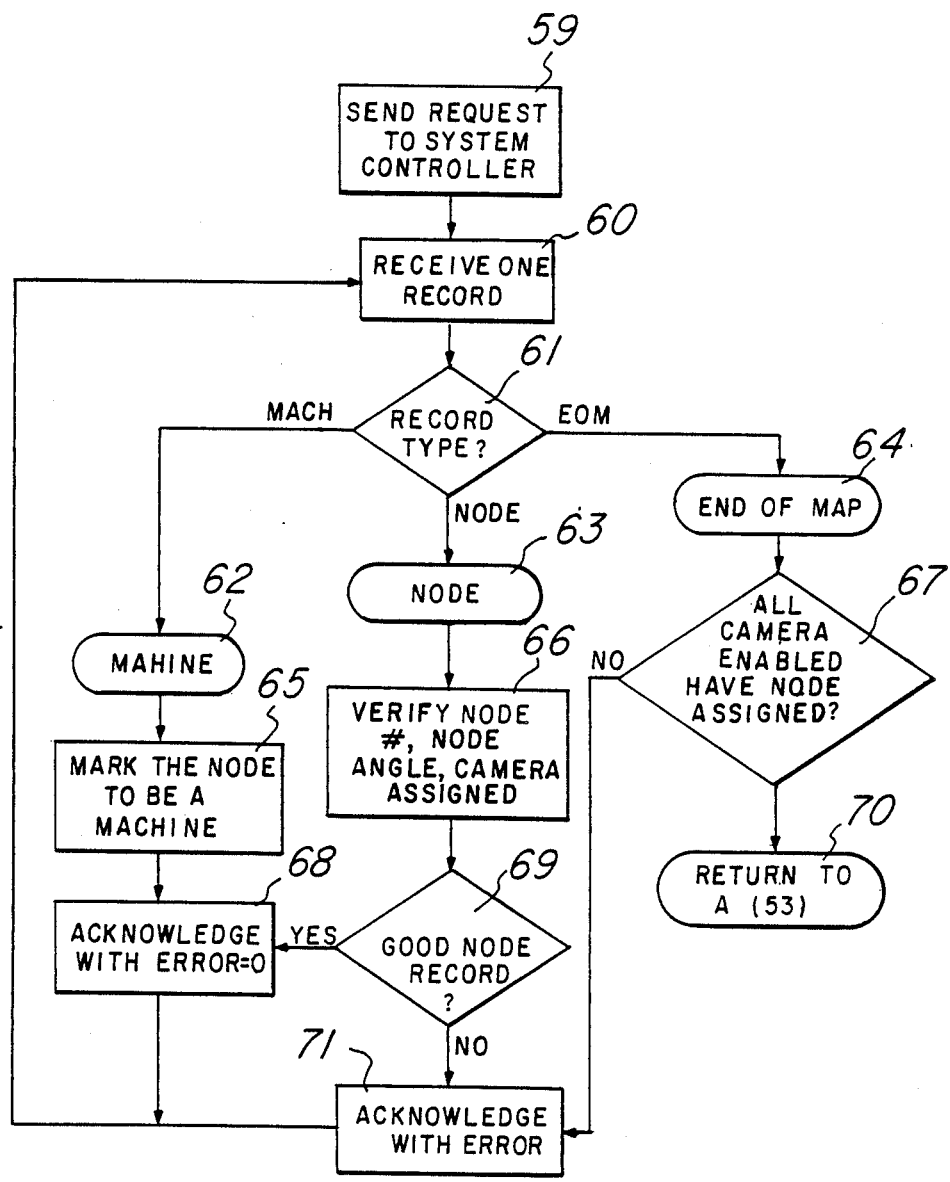
FIG. 13 is a flowchart showing the method the visual navigation system uses to request and obtain knowledge of the AGV operating environment, the "factory map."

A critical factor in the operation of the visual navigation system is knowledge of the environment in which the free-roving AGVs will be moving. As shown in FIG. 13, the visual navigation system requests this knowledge from the system controller 300 at block 59 via the base station 11 at system start-up. It receives the information as a collection of data base records, one at a time 60. As the information is received, it is analyzed and verified according to record type 61. If a record indicates a machine 62, the visual navigation system associates its description with a matching node. This allows the visual navigation system to recognize a given location in factory floor coordinates as a given machine, indicated at block 65. If a record indicates a free node (i.e., one which is not assigned to a machine) 63, the visual navigation system assigns it to the camera associated with its description. A node has a known number, angle, and assigned camera 66. A node's number is simply a tag used to locate the node description in memory. A node's angle is the angle (in factory coordinates) at which an AGV will park when visiting the node. This is important because a node may be a place where an AGV parks to service a machine in the factory. Since the AGV incorporates some form of material-handling device, the parking position and orientation must be described somehow. That is the node angle's function. A node's camera assignment defines which one (and only one) of the overhead television cameras the visual guidance system is to use to view AGVs at that node. This is important because the field of view of an individual camera is often greater than a single node and in many parts of the factory it is desirable to overlap fields of view. However, for reliable and efficient operation it is better to assign a node to one and only one camera.

So, the visual navigation system checks the description of the incoming node for valid node, angle, and camera values. If the values are valid 69, the program acknowledges 68 the record as received and loops to pick up the next record. If the values are not valid, the assigned error value is not zero, as at 71, which allows system operators to determine the problem and reprogram the node. The last record in a factory map stream is an end-of-map record 64. When the visual navigation system receives this record, it checks to be sure that all available cameras have been assigned at least one node 67. If an incoming record contains an invalid value or if there is at least one enabled camera which does not have a node assigned to it, the visual guidance system assigns an error value to the record 71. This error value is used to signal potential problems once the entire factory map has been loaded.

Finding Beacons

The method for finding navigation beacons and converting the image-plane location of the beacon images into factory-floor coordinates is set forth in detail in allowed U.S. patent application Ser. No. 771,433. Essentially, a computer vision system locates highlights in an image plane using a technique called (variously)

centroidification, blob-finding, or connectivity analysis. The raster-scanned image includes bright spots (beacon images), the centers of which can be located in the image plane. The image-plane coordinates are then converted to factory-floor coordinates, thus giving a correlation between the observed beacons and real physical locations. The invention uses this process to locate beacons and the center of the diagonal formed by the corner beacons (the hypotenuse of the right triangle formed by the images of three beacons, or of two beacons and one synthesized beacon image). The center of this diagonal is taken to be an AGV's location. The beacons which form the diagonal and the other chords indicate the AGV's heading. References herein to light blobs, beacon images, AGV centroids, light triangles, and image processing are taken to incorporate the methods disclosed in U.S. application Ser. No. 771,433, unless stated otherwise.

Finding an AGV's Position

Figure 14:
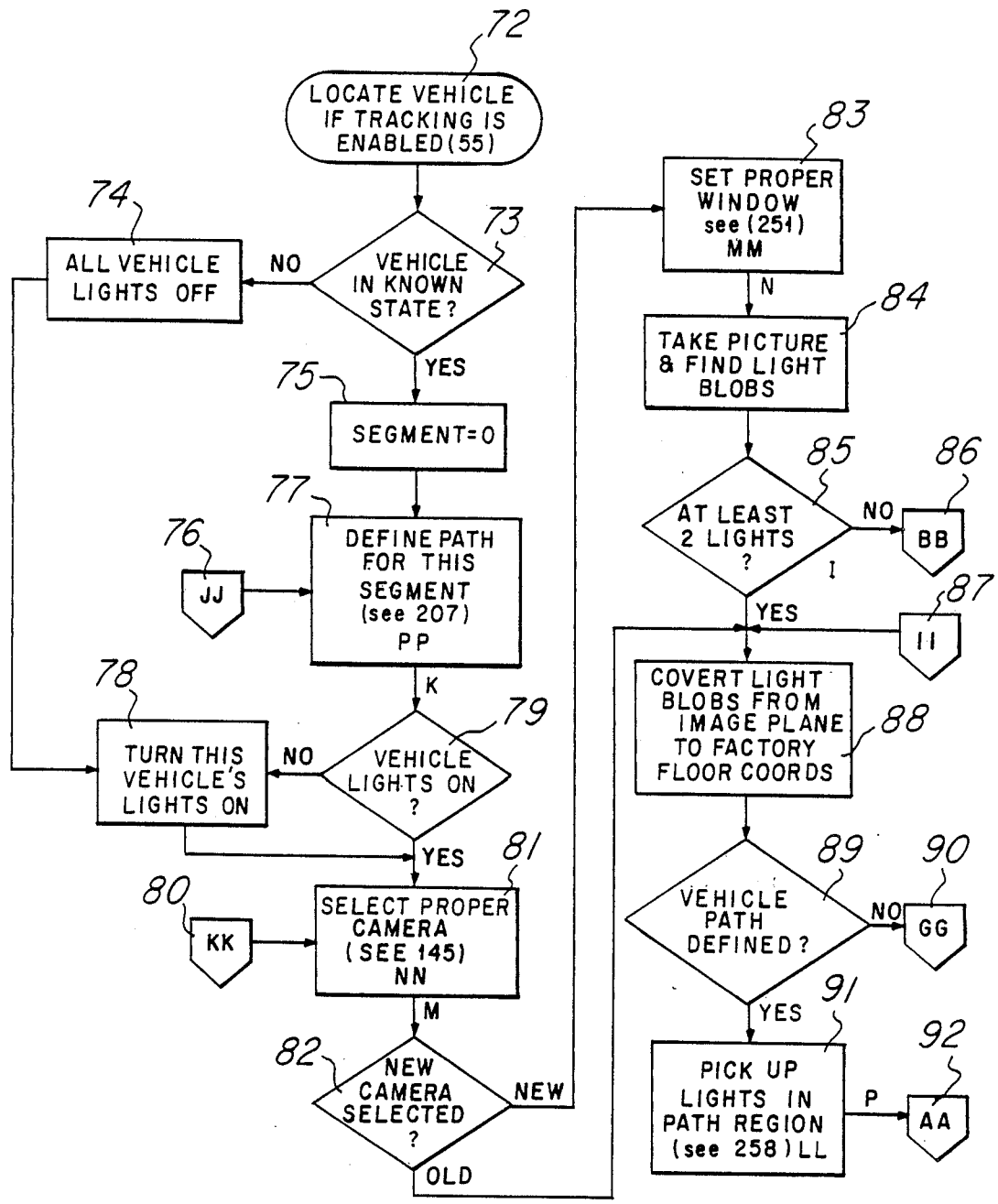
FIG. 14 is a flowchart showing the method the visual navigation system uses to find an AGV and fix its position.
Figure 18:
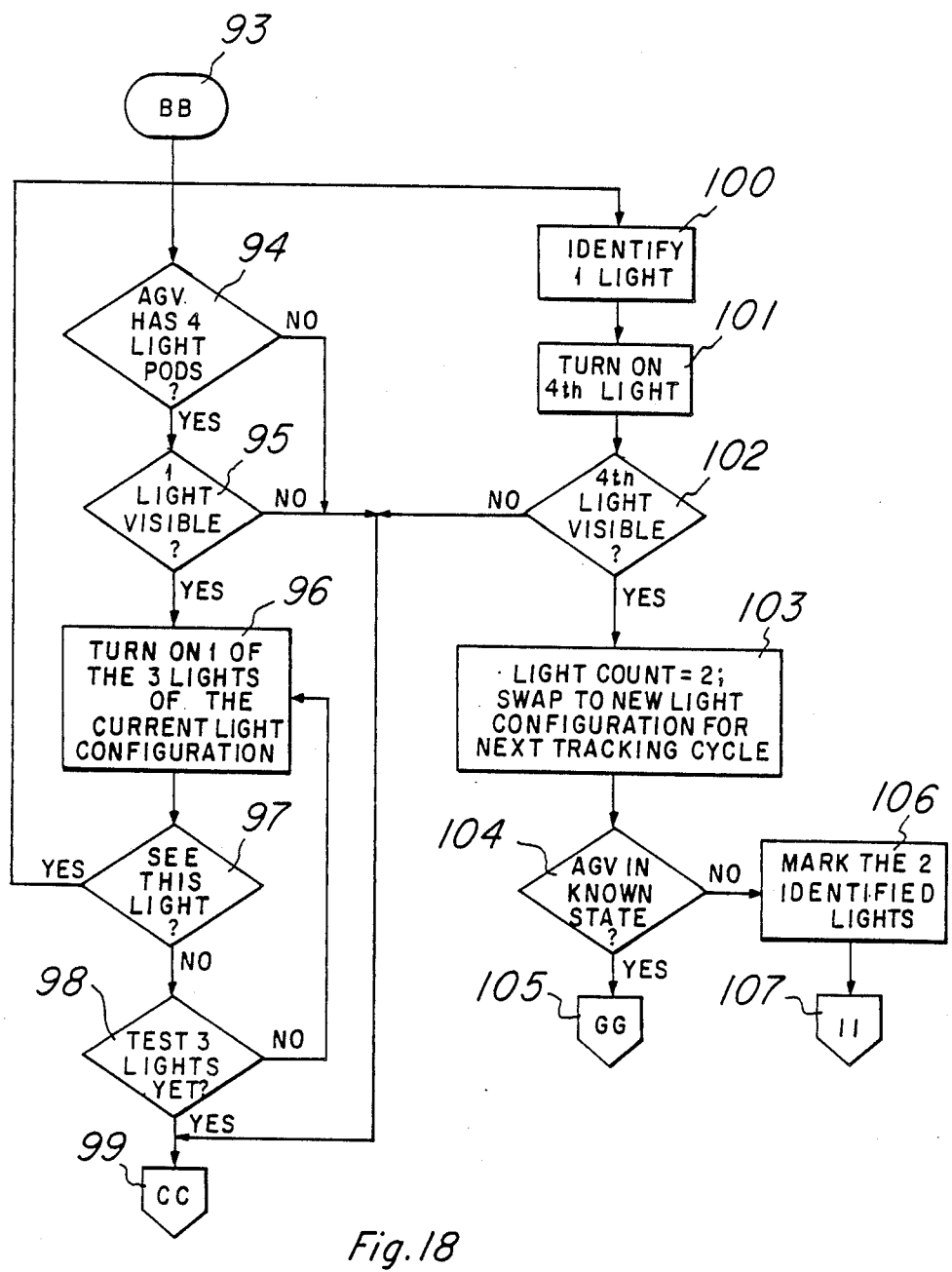
FIG. 18 is a flowchart showing the method the visual navigation system uses to check the number of navigation beacons which are visible.

When the visual navigation system is "tracking" an AGV, as shown in FIG. 14 at 72, it knows the AGV is part of the system and it knows the AGV's light signature. That is, it has been trained to recognize the AGV by the size and shape of its navigation beacon pattern. The visual navigation system first checks to determine the AGV's state 73. There are a finite number of possible states; the visual guidance system 10 simply needs to know that the AGV is indicated as having one of these states. If the AGV is not in a known state, such as when it is first introduced into the system or has been lost behind an obstruction, the visual guidance system 10 sends a "Lights Off" message 74 to all AGVs in the system. It then tells the target AGV to turn its lights on 78. This continues 79 until the AGV notifies the visual navigation system that its lights are on. If the AGV is in a known state at 73, then the system will first define the AGV's current travel path 77 and tell the AGV to turn its lights on (if they are not on already) 79, 78. The system then selects 81 the proper camera to view the AGV. (This procedure is detailed in FIG. 23, which is described later.) If this results in locating the AGV's lights, the visual navigation system begins converting 88 the light blob locations into factory floor coordinates. Otherwise, the visual navigation system sets 83 a new image processing window, as described in FIG. 29 (discussed later), takes another picture 84, and checks for the presence of light blobs. The system needs 85 at least two light blobs to identify an AGV. Some AGVs have three beacons, while others have four 86. Payloads, material handling mechanisms, or factory obstructions may block some of the line-of-sight paths between the selected overhead camera and an AGV's beacons. Therefore, the visual navigation system must be able to discern the number of beacon light blobs and to continue to provide accurate position updates even when some of an AGV's lights are blocked, as shown in FIG. 18.

Once the visual navigation system acquires enough light blobs, it converts 88 the image-plane coordinates to factory-floor coordinates. Because there can be a significant vertical distance between the overhead cameras and the AGV beacons, the wide-angle lenses used in the overhead camera system introduce optical distortions which necessitate factory-floor to image-plane coordinate offsets. A set of equations provides the necessary coordinate transformations. U.S. application Ser. No. 771,433 incorporates the method for making the transformations.

Figure 15:
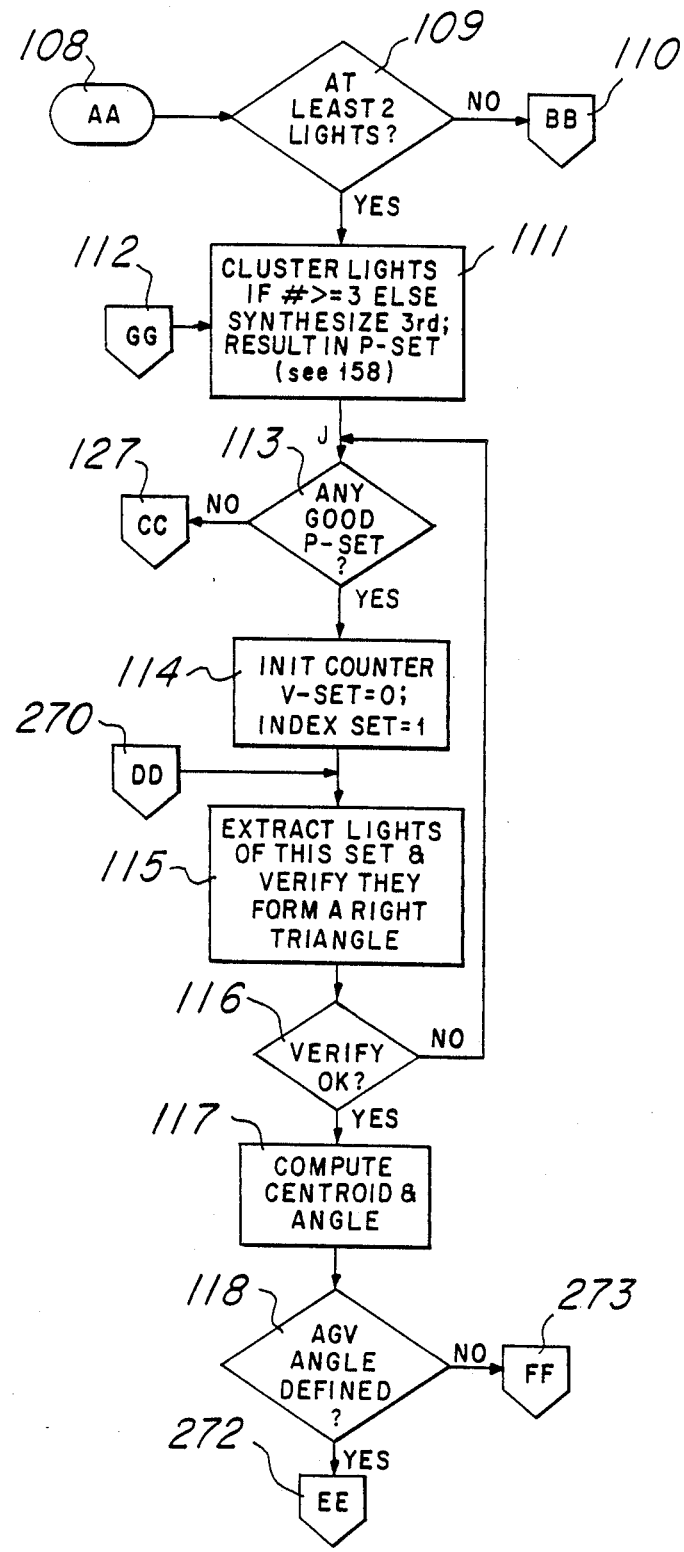
FIG. 15 is a flowchart showing the method the visual navigation system uses to determine whether enough navigation beacons are visible to determine the position of an AGV.
Figure 16:
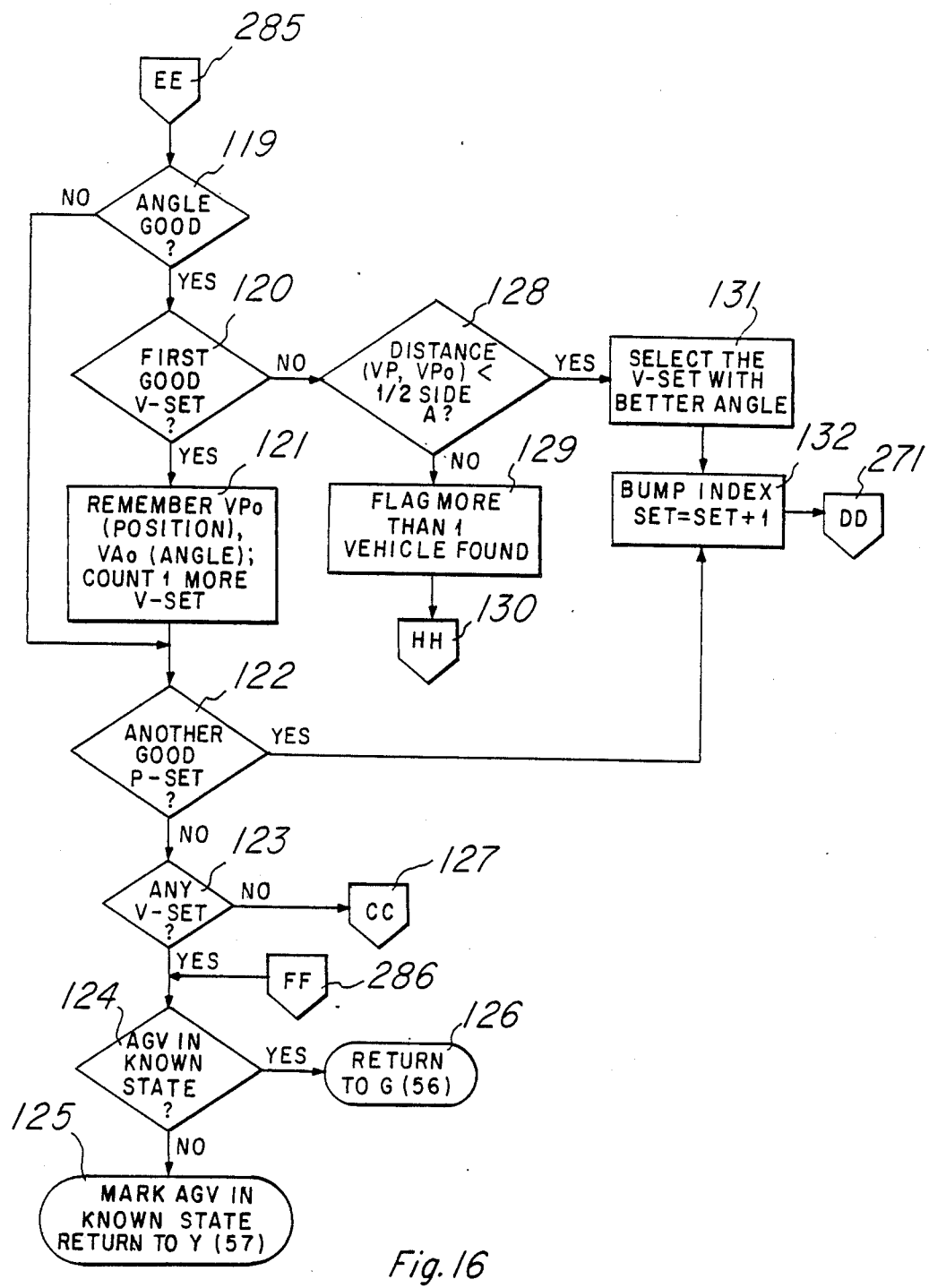
FIG. 16 is a flowchart showing how the visual navigation system determines the AGV's angle of travel from its light configuration.
Figure 19:
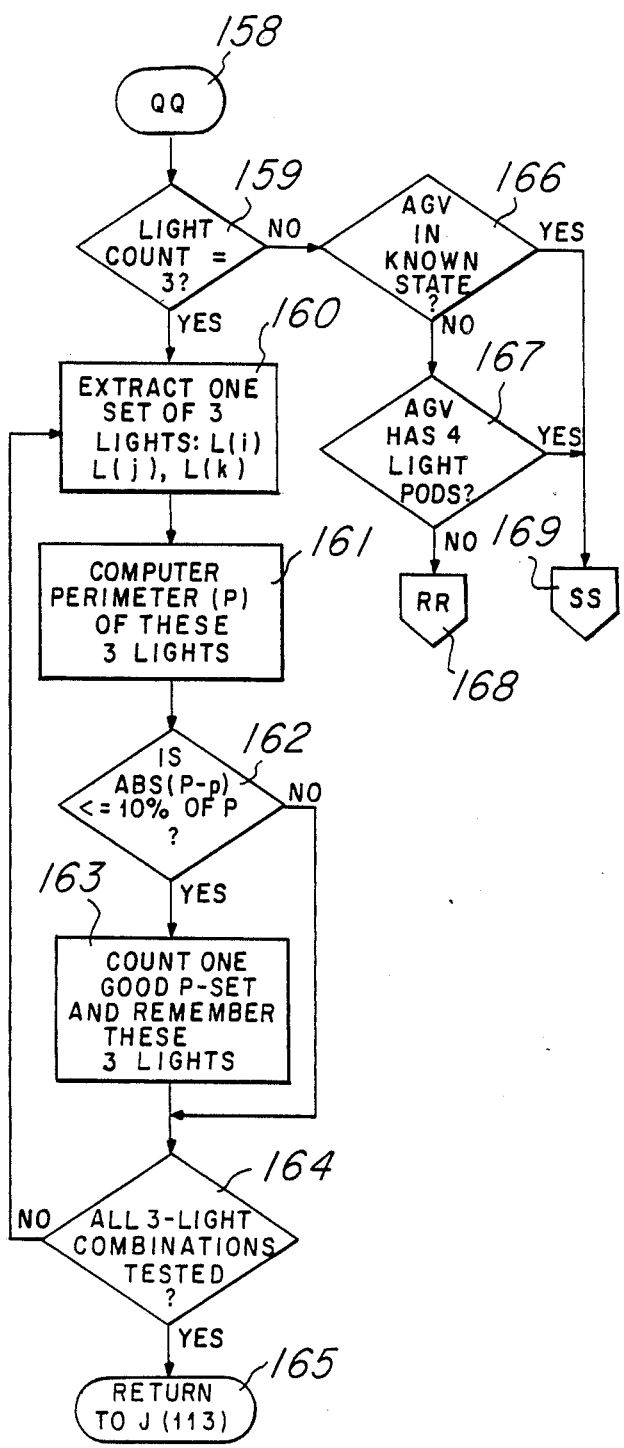
FIG. 19 is a flowchart showing the method the visual navigation system uses to cluster groups of navigation beacon light blobs, such as when 3 or more beacons are visible.
Figure 35:
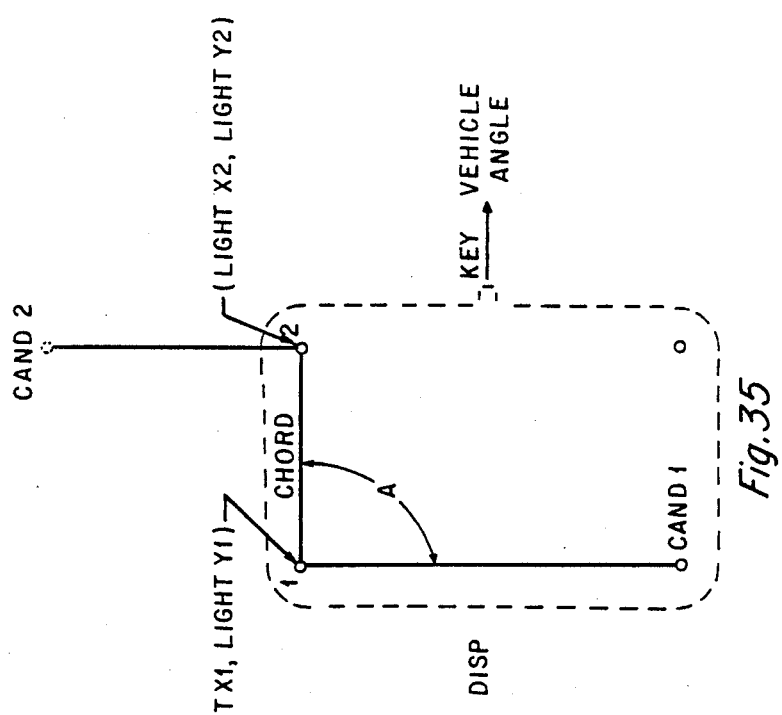
FIG. 35 is a figure showing how an AGV with one or more light(s) obstructed can be viewed as having one specific light pair visible with a third light synthesized in two possible (candidate) positions.

If no path has been defined for the AGV 89-90, the visual navigation system checks the number of lights visible 108 to make sure at least three are visible, as in FIG. 15 at 111 and in FIG. 19 at 158. If fewer than three are visible, it synthesizes a third light as in FIG. 15 at 111 and FIG. 20, beginning at 170. Three lights are needed to confidently identify a cluster of light blobs as a particular AGV (as described above). Since it is possible that three lights may not belong to a single AGV (such as when an AGV passes a lighted machine or another AGV), the three-light pattern is checked (FIG. 15 at 113) to determine whether the triangle formed by the lights has a perimeter which matches a known AGV (p-set) and whether it includes a right angle (v-set) 116. When a light set satisfies both of these conditions, the visual navigation system computes 117 the location and angle of the lights. FIG. 35 illustrates the geometric relationship between the three beacons and the AGV angle. Although the triangle can be formed by beacons at any three of the AGV's four corners, the baseline (vehicle angle) is always taken with respect to the AGV's key, as shown. FIG. 36 shows how the vehicle angle relates to the direction of travel (the path segment angle shown in FIG. 36). When the AGV is moving, the control servo loop acts to keep the vehicle angle and path segment angles parallel. Turning now to FIG. 16, if the AGV's travel angle is defined, then the computed AGV angle will be checked 119 against the defined AGV angle and will be counted as one good v-set (if it passes the check 120). If necessary, another path or camera is checked (127 and FIG. 22, beginning at step 133) to come up with a good light set. Since there also is the possibility that two AGVs can be identified simultaneously, the visual navigation system checks 128 to be sure that any light set which includes a right angle belongs to one AGV. When two three-light sets are imaged, there are three possibilities: (1) both sets belong to the same AGV; (2) one set belongs to a second AGV; (3) the "extra" lights are extraneous (reflections, machine lights, etc.). To detect whether the additional light set belongs to the target AGV, the program determines the center of the hypotenuse of each triangle then compares the locations of these two centers to determine the offset between them. The beacons on an AGV are arranged such that the centers of the hypotenuses of all possible right triangles formed by AGV lights fall within a very small tolerance circle. That is, no matter which three-light set forms the triangle, the center of the hypotenuse so detected is the same for all possible triangles for that AGV. Therefore, if the program detects at step 128 that there is a significant offset between the calculated centers, the program sets a flag which indicates more than one AGV located 129. Otherwise, it chooses the light set with the better angle 131. The desired angle is known from the AGV's "position history" during tracking.

Defining a Path for an AGV

Once the base station tells the visual navigation system to locate a particular AGV, the system determines the AGV's state, resets a path segment counter, and selects a camera to use to find the AGV. However, it doesn't actually search for the AGV until it first defines a path segment and travel zones. This path planning makes it possible to allow the AGVs to be autonomous travellers while retaining a form of closed-loop control via the visual navigation system.

The visual navigation system plans paths which consist of two contiguous path segments and three nodes, where the segments share the central node. As in FIG. 25 beginning at 207, the system first must know which segment to make. It determines whether a node already is defined for the path by checking (as at 208 and 211) the node's assignment bit (if it equals 0, the node is undefined and the program sets the parameters; if it is not 0, the node already is defined and the parameters are in the factory map). If the program must define the position, it sets parameters based on the last known good AGV position 209.

These parameters are:
$x1$ = last good x
$y1$ = last good y
$A1$ = last good A
$T1 = R - M$
$c1$ = last good camera number
where $R - M$ means rotate first, then move
A is the vehicle angle
y is the y-coordinate of the factory location
x is the x-coordinate of the factory location
c1 is the camera number for this segment If the current node is not the first 208 (i.e., it already is defined), the system checks the factory map for this node's position parameters 210. These parameters, from the factory map, are (as defined above):
Position = $x1, y1$
Angle = $A1$
Trajectory from system controller = $T1$
Camera = $c1$ Similarly, at 211, the visual navigation system determines the parameters for the second node (the parameters are similar to those given above for 209 and 210, substituting the subscript 2 for 1). After determining the locations of the two path nodes 208, 211, the system compares 214 the vehicle angles for these two nodes. If the angles differ by less than 5 degrees (an arbitrary straight-line tolerance value) the system accepts the angles 215. If the angles differ by 5 degrees or more 214 the visual navigation system assumes the segments include an AGV turning point (i.e., a circle node as in FIGS. 37 and 38) 216, in which case different travel angles must be set depending upon what happens at the turning point. The choice of 5 degrees is somewhat arbitrary: too large a tolerance angle would decrease system accuracy while too small a tolerance angle would decrease system performance (slow it down). The preferred embodiment provides good performance using the figure of 5 degrees.

There are two possible trajectories at a node: either the AGV rotates, then moves 218 (defined as R-M), or it moves, then rotates 217 (defined as M-R). In the second case, it also is possible for an AGV to move but not rotate later (as when it arrives at a second node for which the trajectory likewise is M-R, i.e., a sequence of nodes defined for "move now, rotate later" such that "later" keeps getting postponed until the AGV reaches a "rotate now, move later" node). The "trajectory", therefore, is just a parameter which can be set or checked to determine the type of AGV motion (rotate, or move) at any node. Again, this is important because the shape of the image-processing window depends upon what type of AGV motion is expected at a node.

In each case, the relevant travel angle is used to set the travel-direction width of the image-processing window. Turning to FIG. 11, it can be seen that the image-processing window must be large enough to accommodate the AGV's entire width 50 along its direction of travel. Since an AGV may have different widths depending upon its direction of travel, the distinction is important and the visual navigation system must be capable of making it.

Figure 26:
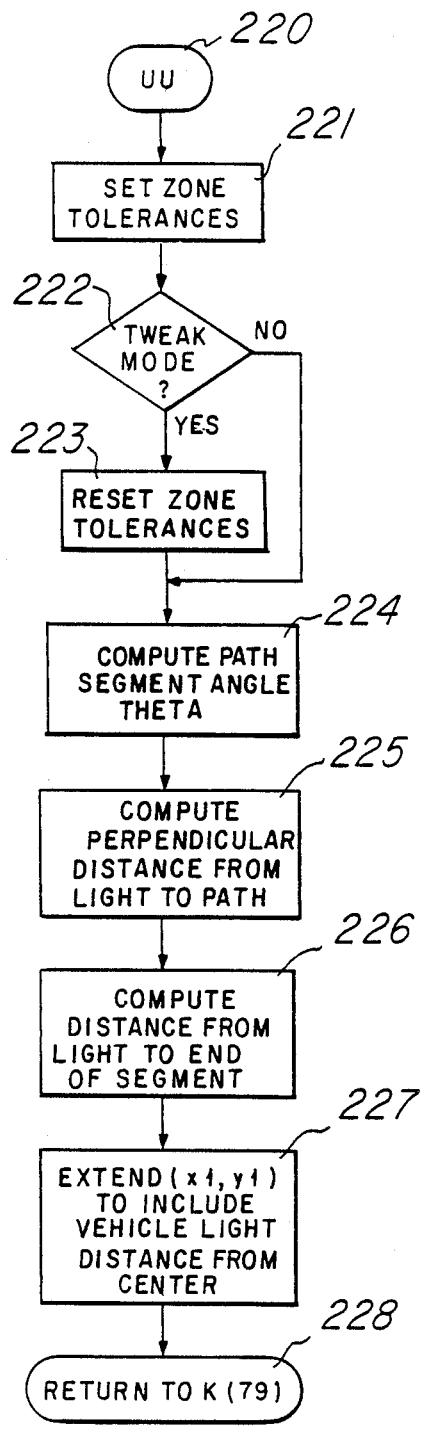
FIG. 26 is a continuation of FIG. 25.

Once the path segment locations and travel angles are set 219, and FIG. 26 beginning at 220, the visual navigation system sets the tolerances of the allowable zones of travel 221. These zones act as "cushions" to allow the AGVs enough leeway along the path to move slightly off course, to correct or overcorrect slightly, and eventually to come back to the proper course—all without colliding with other AGVs or stationary objects or interrupting system operation for critical searching. The optimum tolerances are those which are small enough to keep the AGVs well aligned with the paths and large enough to allow AGV autonomy. The more autonomous the AGVs, the more efficient the system's operation.

The light tolerance distances (i.e., the rectangular light window size) depend on the path segment angle 224 and the size of the AGV (displacement of its lights along each and either side of the path axis). The visual navigation system computes these tolerances 225–227 according to the geometries defined in FIGS. 36–38. The method used for computing these distances depends upon the types of nodes involved. As shown in FIGS. 36–38, the geometry of an AGV's position relative to a path segment depends upon what the AGV is expected to do at each of the two nodes of the segment. In the case depicted in FIG. 36, the AGV is expected to exhibit straight-line motion at each node. That is, the AGV's travel angle will not change at either node. However, as shown in FIGS. 37 and 38, the calculations are different when the AGV must turn at either node.

The difference is significant. When an AGV is moving in a straight line (i.e., not rotating about its center), its only possible "shape" is rectangular. That is, a rectangular image processing window can be set to be slightly larger than the AGV's length and breadth yet still have a high probability of containing all the AGV's beacons. However, if the AGV turns at either node, the image processing window at that node must be circular to have even a reasonable chance of including the beacons.

The mathematics involved in calculating the dimensions of the image processing windows are straightforward. The geometries involved are shown in FIGS. 31–38. Turning now to FIG. 36, the dashed line describing the large rectangle indicates the defined boundaries of a "window" which exists in the visual navigation system computer's memory. The window represents the portion of the computer memory which will be searched for images of AGV beacons (for an AGV at or between the two node). The program uses the mathematical relationships defined below to set the dimensions of this processing area so as to include all possible positions of the beacons, plus a small tolerance value (EPSLON), without including any other extraneous lights. In FIGS. 36–38, an AGV is represented by the small dashed rectangle with rounded corners. The AGV is assumed to be moving from Node N1 to Node N2. FIG. 36 assumes that motion between the nodes is linear, but not perfect (that is, the center of the AGV does not move precisely along the line segment N1N2. This closely approximates the typical actual motion of an AGV. Given that the image processing system can identify and compute the locations of the beacons (the small circles at the corners of the AGV), simple trignometry defines the other relationships shown in FIGS. 36–38. It is important is to be able to define distances D1 and D2 (from the right triangles defined by a beacon, the AGV center, and the path N1N2).

Referring now to FIG. 36, processing the locations of beacons B1 and B2 defines several important relationships. D1 is the perpendicular distance from beacon B1 to path segment N1N2. D2 is the perpendicular distance from beacon B2 to path segment N1N2. P1 is the parallel distance from B1 to the AGV center (the calculated center of the hypotenus of the triangle formed by the beacons). P2 is the parallel distance from B2 to the AGV center.

Assuming that the calculated AGV center is precisely at a node, then in order to be sure of enclosing all AGV beacons in the processing window the program must set the end margin of the window to be:

$$P = \max(P1, P2)$$

and the perpendicular distance from the node to the window border:

$$D = \max(D1, D2)$$

To allow a small tolerance, EPSLON (about 6 inches for the embodiment described here) is added to each of these dimensions.

Similar calculations are done at each node. Basically, then, this part of the program determines which beacon is furthest from the path segment, calculates the perpendicular distance P and the parallel distance D, and adds the tolerance distance EPSLON to describe the boundaries of the software window in memory for a given two-node path segment.

The image processing system provides a correlation between locations in memory and the physical world by incorporating transformation tables which give a one-to-one correspondence between points (light blobs such as beacons) in the image plane and two-dimensional locations in the plane of the factory floor (as described in allowed U.S. application Ser. No. 771,433).

Turning now to FIGS. 37 and 38, the illustrations show both the rectangular and the circular image-processing windows necessary to cover the cases where an AGV rotates at a node (N1 for FIG. 37, N2 for FIG. 38). The circular window has a radius R which is half of the hypotenuse between two diagonal beacons plus the square root of 2 times EPSLON. This is the radial equivalent of the tolerance distance described above for the rectangular window. It is applied to allow the circular window to always be a bit larger than the minimum necessary to enclose all the AGV's beacons regardless of its rotation. For example, as shown in FIG. 37, an AGV is expected to rotate at N1. To make sure of enclosing all AGV beacons, the window in memory must include about the node a circle with radius at least half the length of the beacon triangle's hypotenuse. The image-processing window's "cushion," EPSLON, allows the AGVs enough leeway at rotation nodes. The rectangular window is the same as described for FIG. 36 for linear travel. The same reasoning holds for the case shown in FIG. 38, which is rotation at the other node, N2. Therefore, when an AGV rotates at a node, the image-processing system searches a circular area of its image plane sufficiently large to capture all the AGV's beacons at all angles of rotation.

The visual navigation system must be able to give unambiguous position updates at any kind of node and at all positions of travel between nodes. The embodiment described here provides the means to calculate the paths required and to measure AGV position relative to those paths at all points along the path. Once a path is defined for the AGV, as in FIG. 14 at 89, the visual navigation system searches the path for AGV lights 91.

Selecting the Proper Camera

The sensors for the visual navigation system are television cameras. The factory is wired with a sufficient number of cameras to view all of the nodes defined for the factory. It is not necessary to have the same number of cameras as nodes; it is sometimes better to have one camera view several nodes. However, each node must be visible to at least one camera. As these cameras view the factory, each continuously produces raster-scan images called pictures. A picture has the property of being a "snapshot" image of a particular field of view at a particular instant of time. A picture may or may not include the image of the navigation beacons of an AGV. In addition to being able to determine whether a picture does indeed include AGV beacons, the visual navigation system must be able to determine which camera's pictures should be applied to the computer vision system's image processor. As described above, the factory map contains the knowledge of which camera views which node. In addition, the path defined for an AGV includes the knowledge of which nodes are defined for the AGV. Paths are assigned as two path segments which connect three consecutive nodes. Therefore, the system always "knows" at least two cameras (the camera for the first of the two nodes, and the camera for the second of the two nodes) which are logical candidates for viewing a particular moving AGV.

Figure 23:
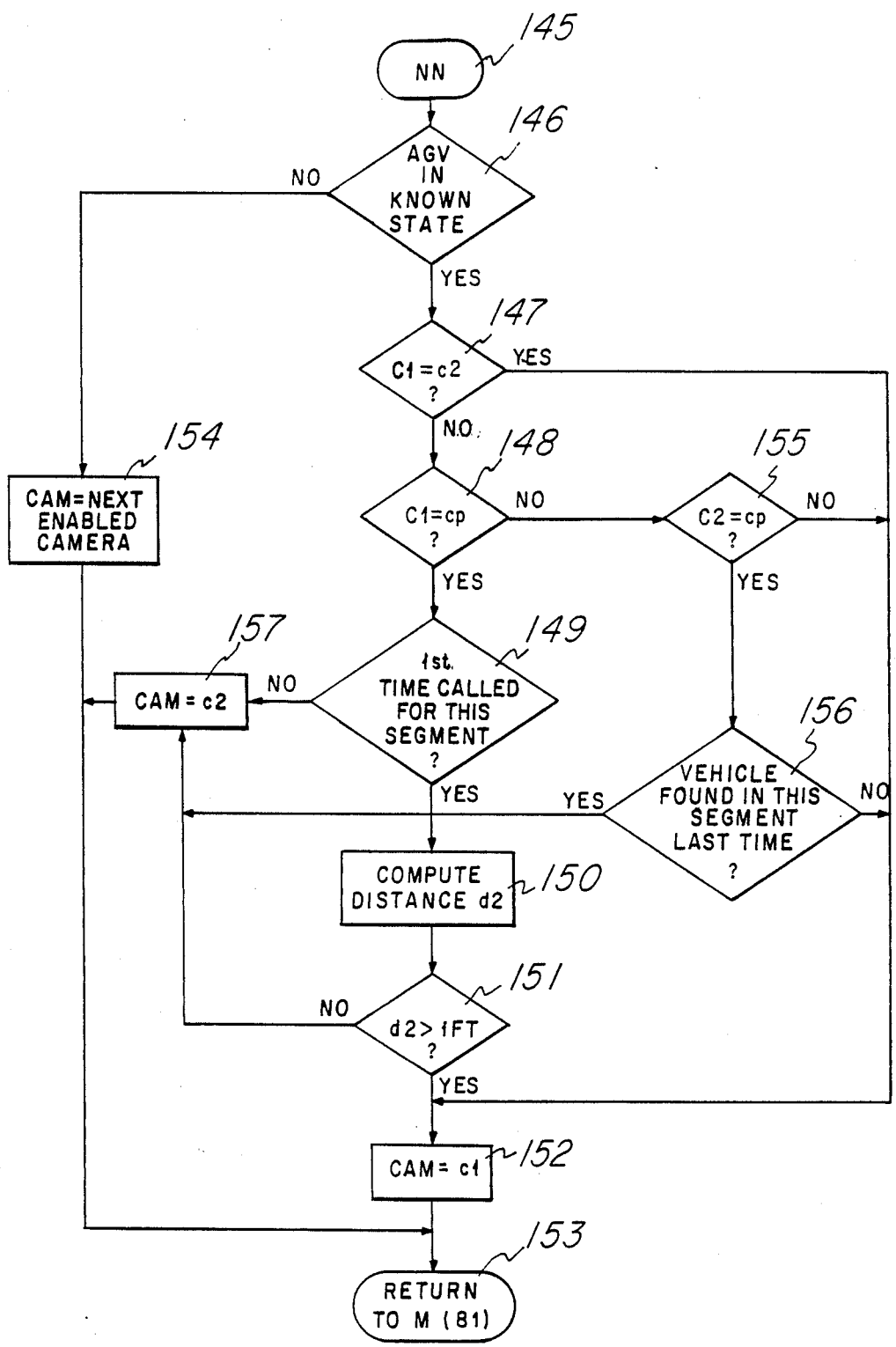
FIG. 23 is a flowchart showing the method the visual navigation system uses to select the proper camera for picture processing.

Turning now to FIG. 23 at 145, the flowchart shows the method for choosing the proper camera to conduct a search. First, the system checks the target AGV's state 146. If the state is unknown (as when it is first introduced to the system or is enabled after being reset), the visual navigation system uses 154 the next camera in the camera list (defined for the path). Since the AGV has assumed some unknown state, the best selection that can be made is the next camera in the list. Returning to FIG. 14, the camera number is incremented until the AGV lights are located or the camera list is exhausted. As shown at step 82, one of two cameras can be selected: either the "old" camera (the camera which was used for the previous segment) or a "new" camera (the camera assigned to the next segment). Since there is as yet no path segment defined for an "unknown" AGV, the system will select the "new" camera.

As shown in FIG. 23, however, if the AGV is in a known state 146, the visual navigation system checks 147 whether the cameras assigned to Nodes 1 and 2 are, in fact, the same. If they are the same, there obviously is no need to switch cameras for the next picture. If they are not the same, the visual navigation system must be able to decide which camera to use for the next picture. This decision can go either way: use the same camera as used for the most recent picture, or change to another camera (depending upon the circumstances).

The node numbers used here are arbitrary, indicating only that Node 1 comes before Node 2 in a path. For the flowchart shown in FIG. 23, then:

c1=camera assigned to node 1
c2=camera assigned to node 2
cp=camera used for previous picture This condition is important if the target AGV is approaching a node which is defined as a machine. To maximize parking accuracy (repeatability) at machines, it is best to park using the same camera regardless of direction of travel. For example, suppose an AGV can approach such a node from either of two directions. As the AGV approaches the node it is covered by a camera. While it is possible that one camera views both approaches, it also is possible that the fields of view of two cameras will overlap at the node, in which case a decision must be made as to which camera to use. As shown in FIG. 23 at 152, if the camera assigned to both nodes are the same, the system selects the camera for Node 1 as the camera to search. If they are different, the visual navigation system checks 148 which of the cameras was used for the previous picture (cp). If the camera used for the last picture was 155 the camera for Node 2, the system checks 156 whether the target AGV was found in the previous picture; if so, the system selects 157 that camera as the current camera. If the AGV was not in the previous picture 156, the system chooses 152 the camera for Node 1 (the only other likely candidate). If the camera used for the previous picture was 148 the camera for Node 1, the system checks 149 whether the current picture is the first for this segment. If the current picture is not the first, the system selects 157 the camera for Node 2 for the next picture (because if this is at least the second picture as the AGV moves from Node 1 to Node 2 then there is a better than even chance that the AGV has moved out of the field of view of the first camera and into the field of view of the second camera. However, if the current picture is the first taken for this path segment 149 (i.e., the picture comes from the camera defined to be the first camera in the sequence of cameras which cover the first path segment), then there is no need to switch cameras so the system selects the picture for processing 150.

Figure 1:
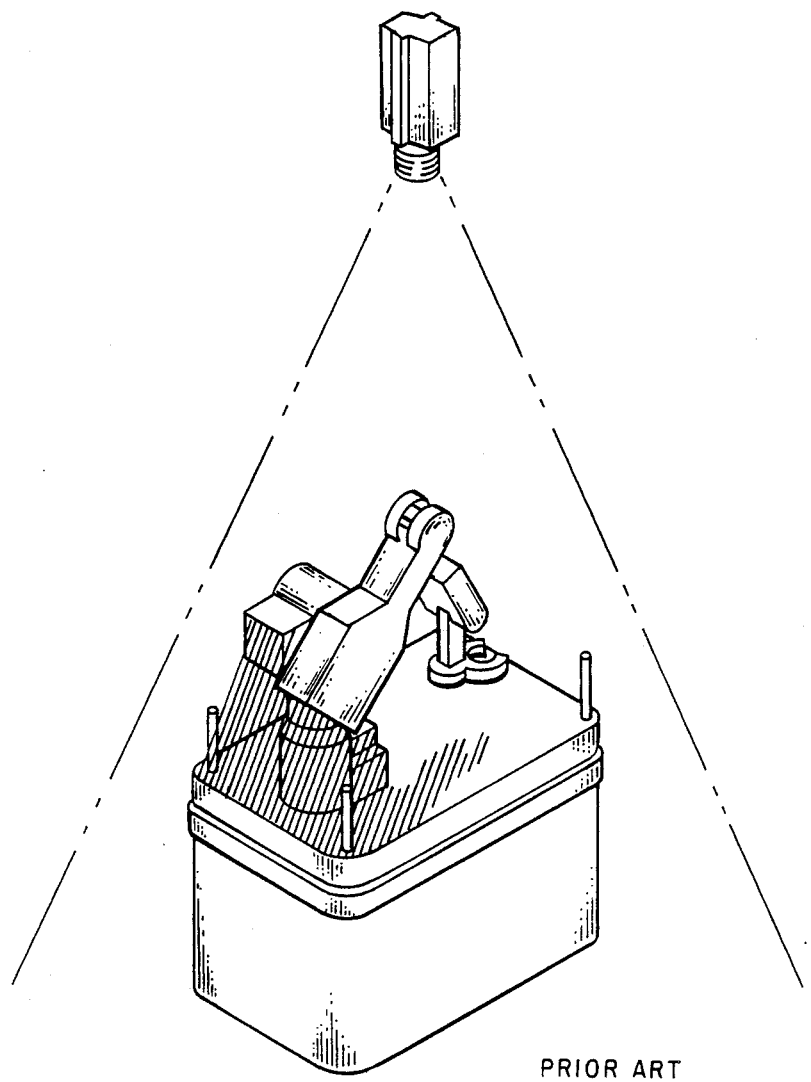
FIG. 1 is an illustration showing how a robot arm or payload may obscure the navigation beacons on an AGV.
Figure 2:
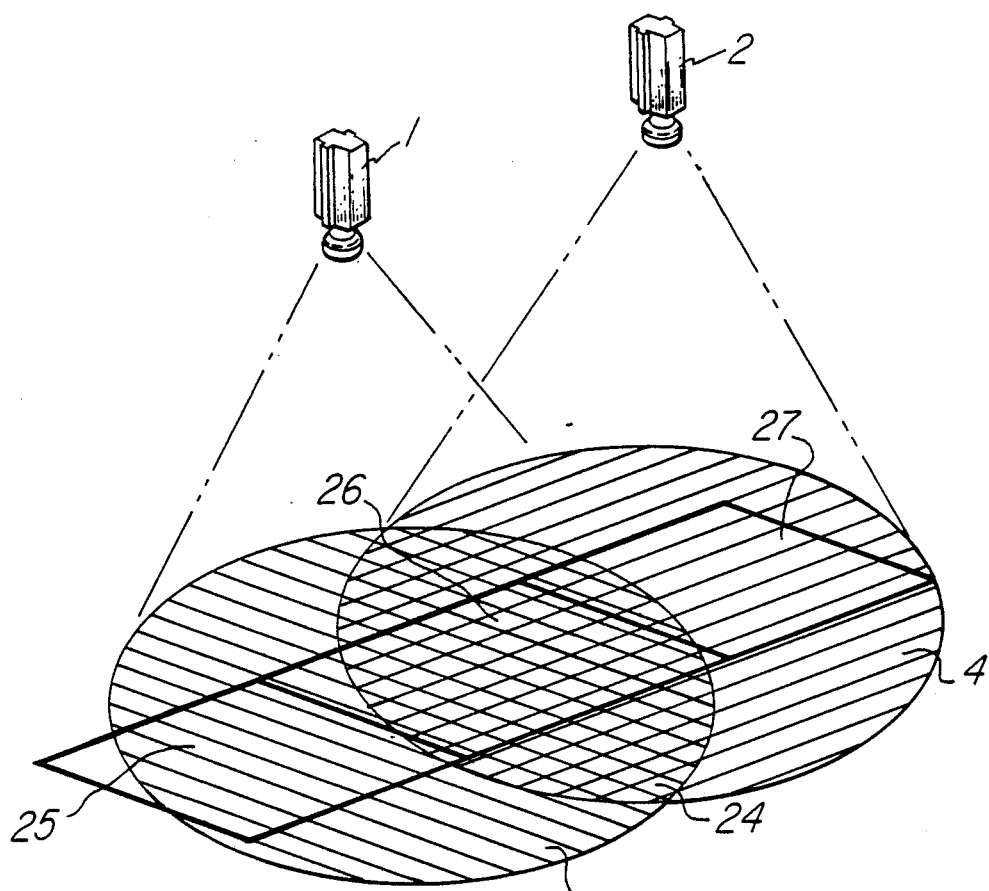
FIG. 2 is a representation of the possible overlap of different cameras' fields of view and how this overlap is handled using node assignments.

To improve parking accuracy at machine nodes, as mentioned above, the system determines whether the distance d2 is less than 1 foot 151. This distance is the distance from the parking node (e.g., a machine) to the last good position of the target AGV. The distance check allows the visual navigation system to ensure that a parking AGV always has at least one opportunity to park with the camera assigned to the parking node. For example, as long as d2 is greater than 1 foot, the assigned camera 152 will be the camera used for the previous picture (while the AGV is travelling, approaching the parking site). But, when d2 is less than one foot, the visual navigation system switches 157 to the second camera (the camera assigned to the next node, the parking node). FIG. 2 shows a graphic representation of what happens when the fields of view 3 and 4 of two cameras 1 and 2 overlap 24 at the same node 26. An AGV approaching such a node 26 can be guided by either camera 1 or 2 while it is visible to both. However, because of the effects introduced by lens distortion, if the node 26 is a parking node the guidance error may be larger than the required parking accuracy. To minimize this problem, it is necessary to ensure that any AGV parking at the node 26 always park there under the guidance of the same camera. Therefore, the node 26 must always be assigned to the same camera (e.g., camera 1).

The sequence described in FIG. 23 is a means of selecting which of two cameras is a better choice as the current camera. By step-wise repetition, the sequence can be used for any number of cameras. In practice, the best mode is to match the number of cameras scanned to the number of nodes in a single path segment, plus one. This results in maximum scan coverage (two path segments) in minimum scan time.

Setting Coarse Processing Window Size & Location

Figure 29:
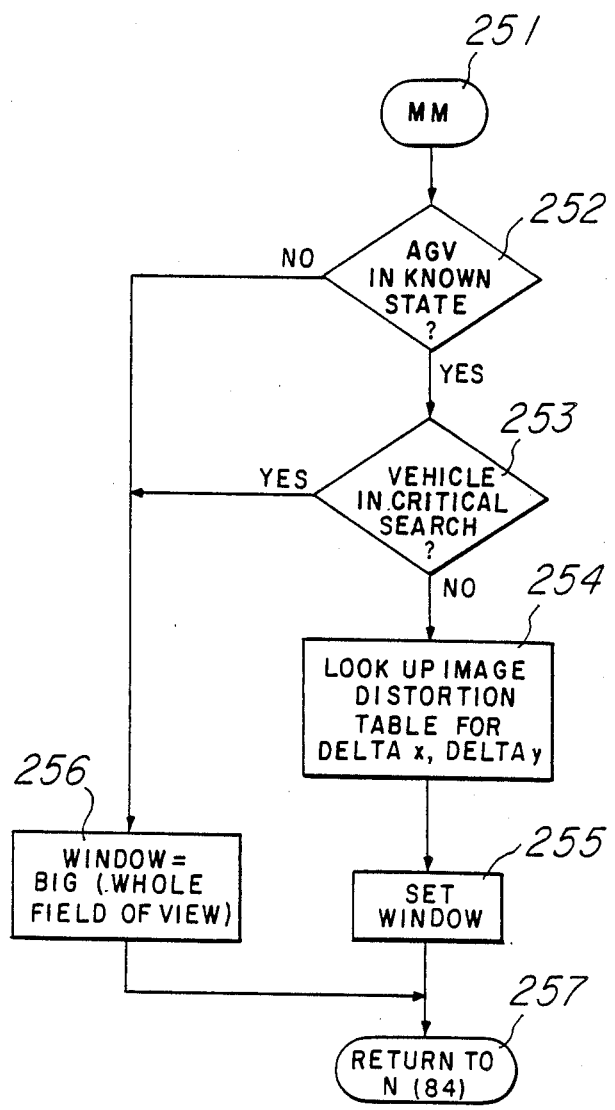
FIG. 29 is a flowchart showing the method the visual navigation uses to set the proper size and location for the image processing window.
Figure 30:
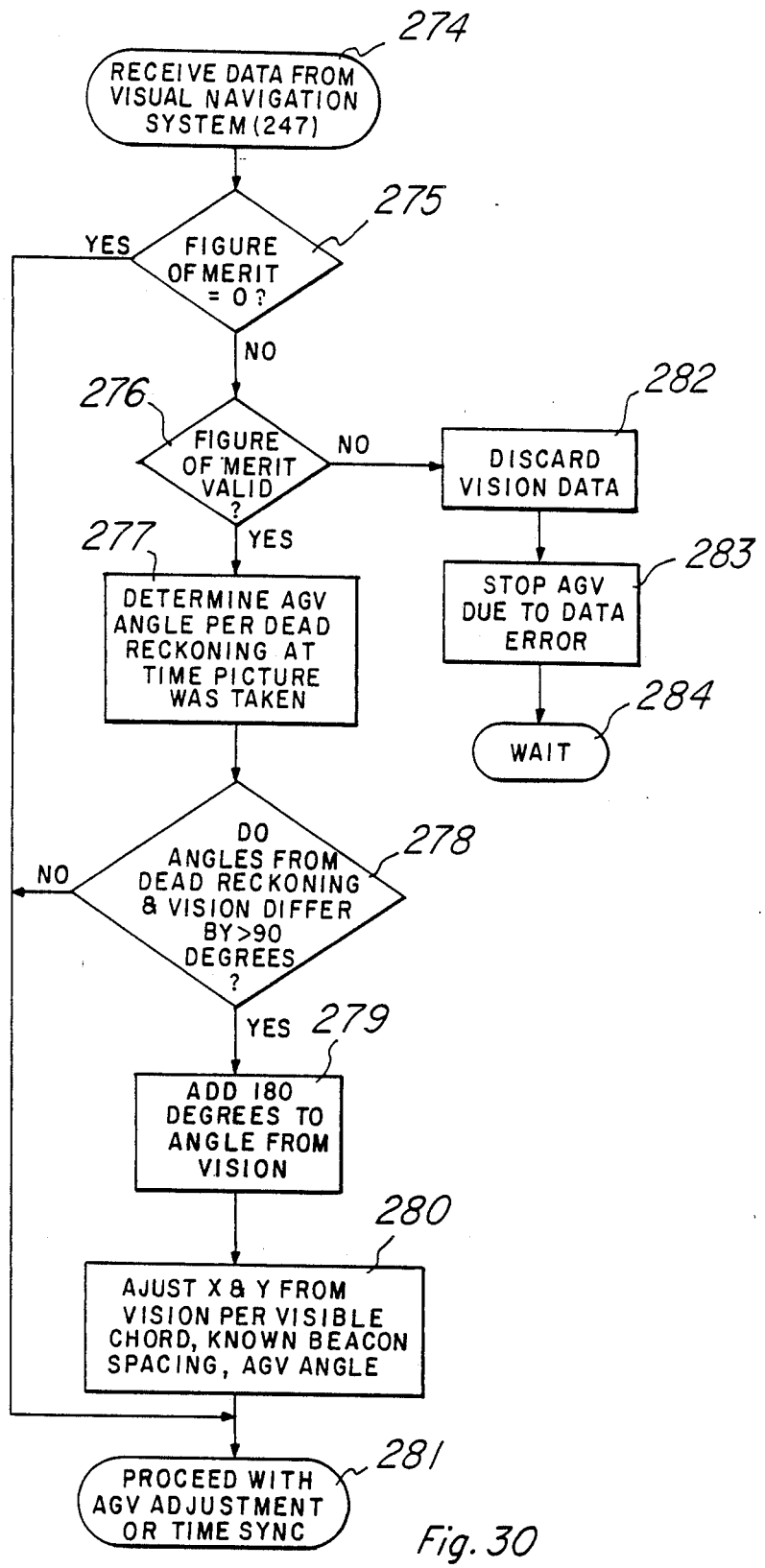
FIG. 30 is a flowchart showing how the AGV controller responds to the visual navigation system's position update when the visual navigation system indicates it is not certain of the AGV's position.
Figure 31:
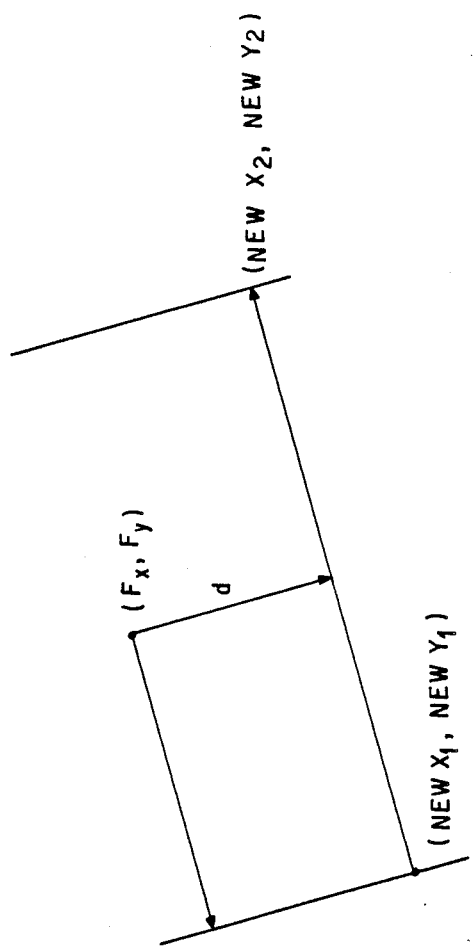
FIG. 31 is a figure showing how the perpendicular distance from an AGV's actual path to a travel zone is measured.

The visual navigation system avoids processing spurious images such as reflections and lights from machinery by processing only those light blobs which occur within a controlled area of the image as shown in FIG. 29 at 251. The size and location of this "window" is determined by the state of the target AGV 252-253 and by its last known position in the image plane (Pcx,Pcy) 254. These parameters are important because the visual navigation system uses a big window 256 (the entire field of view) during a critical search 253 to better its chances of locating an off-course AGV. This also is true when the AGV's state is unknown 252 (e.g., when the visual navigation system does not known the AGV's state, it must be able to view as much of an image as possible to improve its chances of locating the AGV).

However, when the state is known and not critical (as when moving normally within the control of the servo loop), a small window is used for image processing. The exact dimensions of a small window are determined by values in an image distortion look-up table 254 for which the index is the distance in X and Y (factory coordinates) from the AGV center to the optical axis of the camera:

$$wx1 = Pcx - \text{delta } x = \text{negative offset in x direction}$$

$$wx2 = Pcx + \text{delta } x = \text{positive offset in x direction}$$

$$wy1 = Pcy - \text{delta } y = \text{negative offset in y direction}$$

$$wy2 = Pcy + \text{delta } y = \text{positive offset in y direction}$$

The process of defining the window begins with a determination of whether the target AGV is in an unknown state or a critical state 252. In either of these cases, the visual navigation system selects a big processing window 256. But if the target AGV is in a known, non-critical state then the visual navigation system checks 254 the image distortion look-up table for the image distortion factors for the AGV's previous location in the image plane and sets the processing window 255 to be as small as possible while still allowing for the effects of distortion.

Finding an AGV Light

Figure 17:
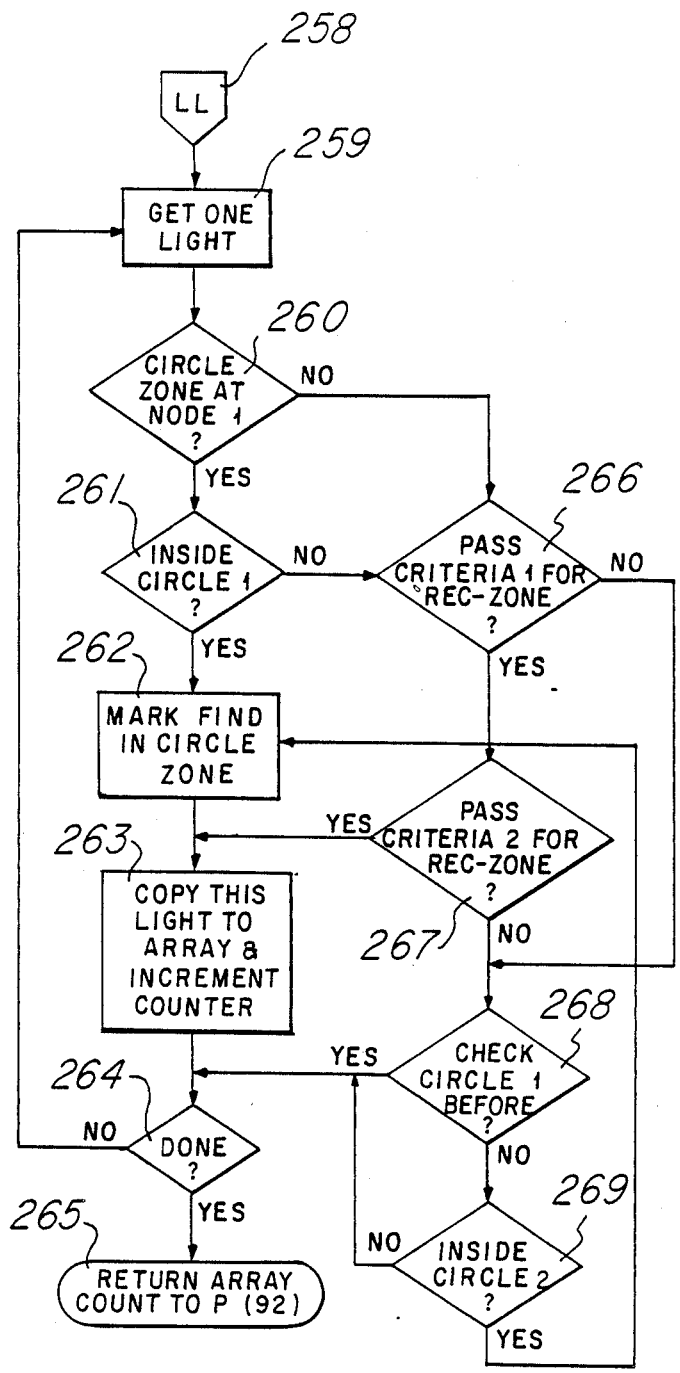
FIG. 17 is a flowchart showing the method the visual navigation system uses to recognize a single AGV navigation beacon.

Since there are two types of nodes where AGV motion is allowed, the vision system interprets two types of light searches, as shown in FIG. 17. If the AGV is expected to be turning (rotating), the current node in the path is defined 260 as circular and the visual navigation system checks 261 to see whether the light is within the boundaries of the circular window. If so, the light is marked as found 262 and is copied 263 to a memory array. The process is repeated for all the light blobs inside the coarse image processing window 264. The array count is returned 265 to P (indicated in the lower right-hand corner of FIG. 14 at 92, and detailed in FIG. 15) where the visual navigation system checks the number of visible lights and attempts to recognize an AGV. However, if the AGV is expected to be moving laterally (moving without rotating), the current node in the path is defined 260 as rectangular and the visual navigation system checks 266 to be certain the light is within the boundaries of the rectangular window. If so, it is stored as before 263; otherwise the light is checked 268 to see whether it lies within the boundaries of a circular zone (if the next node is defined to be circular). These processes are repeated 264 until all the lights within the coarse image processing window have been processed.

Checking For Enough Visible Lights

The visual navigation system's image processing software isolates light sources and defines their locations as the centroids of the blobs identified by the processing algorithms.

Figure 34:
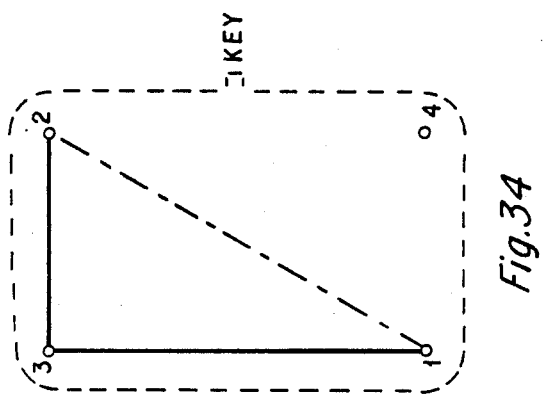
FIG. 34 is a figure showing a typical light triangle as viewed by the visual navigation system.

As described earlier, an AGV is defined by the triangles formed by three of its beacons (FIG. 34). An AGV's position is defined as: the factory-floor coordinates of the center of the diagonal formed by two light sources identified as corner beacons, the perpendicular distance of this AGV center from the line which forms the path segment (a line between the two nodes), and the parallel distance of the AGV center (the straight-line distance from the AGV center to the end of the path segment, along a line which is parallel to the axis of the path). Therefore, three lights are required to determine an AGV's position and orientation.

Figure 32:
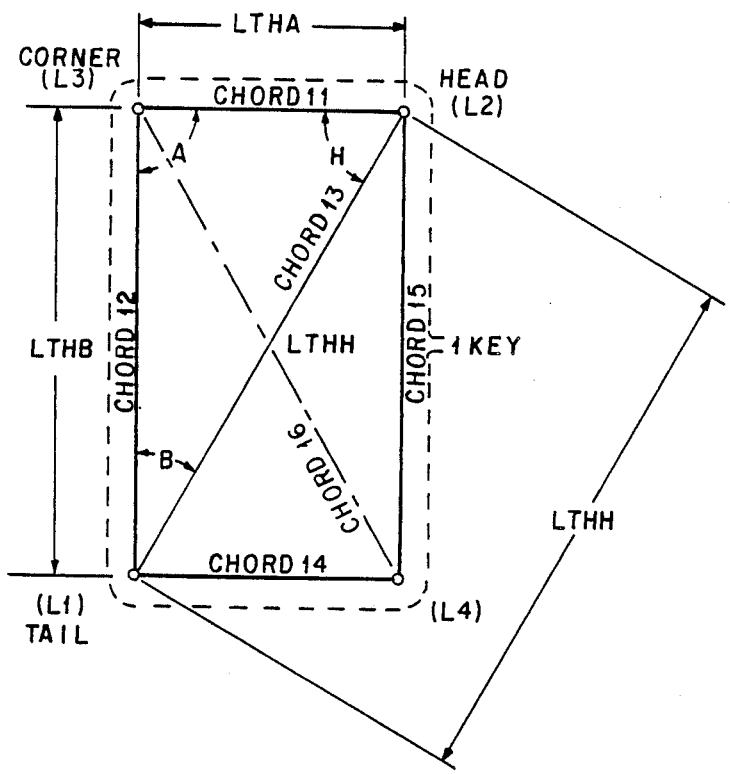
FIG. 32 is a figure showing all the possible chords which can be formed by an AGV's lights and how these chords indicate significant measures which correspond to that individual AGV.
Figure 33:
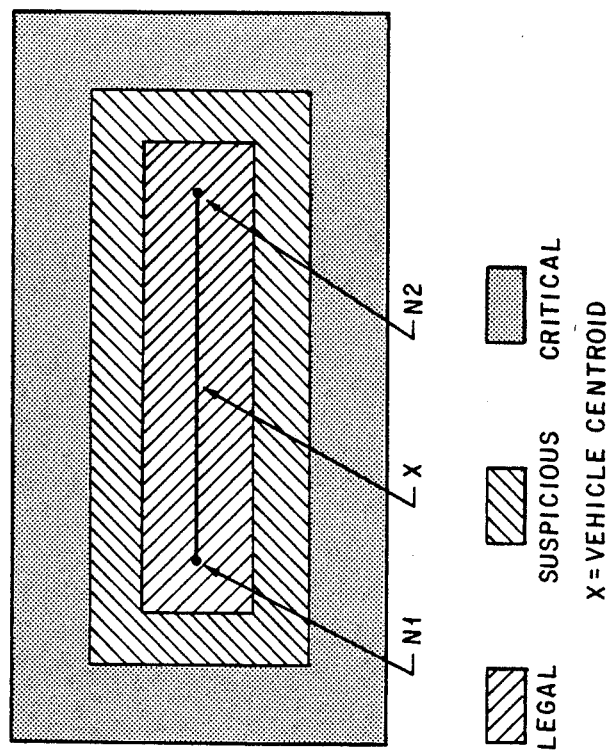
FIG. 33 is a figure showing the allowable zones of travel for an AGV for one path segment including two end nodes.

In practice, at least one of the three required beacons may be obstructed. The two beacons which are visible form a chord which is recognizable to the visual navigation system. As shown in FIG. 32, there are a number of such possible chords. The chord numbers (11–16) are significant when the visual navigation system reports an AGV's position without confidence. As described below (Synthesizing a 3rd Light when Others are Blocked), this situation is most likely to arise when a beacon is obstructed.

Determining the Number of Lights Visible

Since there are two types of AGVs in the system described herein (one having four lights, the other having three), as shown in FIGS. 15 and 18, the visual navigation system determines 109, 110, 93, 94 which type of AGV it seeks. It then checks as in FIG. 18 at 95 to see whether at least one light is visible if the target AGV has four beacons. If it does not find a light, it checks to determine whether another camera or path segment should be searched for lights 99 (detailed in FIG. 22). If the visual navigation system "sees" only one light 95, it sends a message to the AGV to turn on one and only one light of its current light configuration 96. It then "looks" for this light 97 (using the image-processing methods described earlier and disclosed in U.S. application Ser. No. 771,433) until it identifies it 100 or has tested all of that AGV's lights 98. If it ultimately can't find the light 99, it checks as in FIG. 22 at 133 to determine whether to use another camera or path segment. If the visual navigation system identifies one light as in FIG. 18 at 100, it then attempts to find the fourth light 101. Once it finds the light 102 it increments the light count and swaps to a new light configuration 103 for the next tracking cycle. The light count triggers AGV identification when it reaches two 105, 107.

Clustering Lights

As described earlier, the visual navigation system identifies an AGV's location as the center of an imaginary line drawn through two light blobs which correspond to beacons located on diagonally opposite corners of the AGV. When more than three lights are captured, the visual navigation system simplifies the situation by "clustering" the lights FIG. 19 at 158 to form the best set of three lights to use in tracking. To do this, it selects 160 a set of three lights and computes 161 the perimeter of the triangle formed by these lights. At step 160:

$$1 \text{ in}$$
$$n8$$
$$j = i + 1$$
$$k = i + 2$$

The visual navigation system checks 164 all such three-light combinations, comparing 162 each to the previous set to determine which set gives a difference within plus or minus 10 percent of the expected value. The value of 10 percent is an arbitrary selection which gives good performance in the preferred embodiment. At step 162:

P=taught perimeter of this AGV
10% of P=tolerance due to wide-angle lens distortion It selects 163 the set which falls within this range and passes the light selections to the routine which determines whether any good light triangle perimeter is found 165 and returned to the perimeter checking routine, shown in FIG. 15 at 113.

Synthesizing a 3rd Light when Others are Blocked

Figure 20:
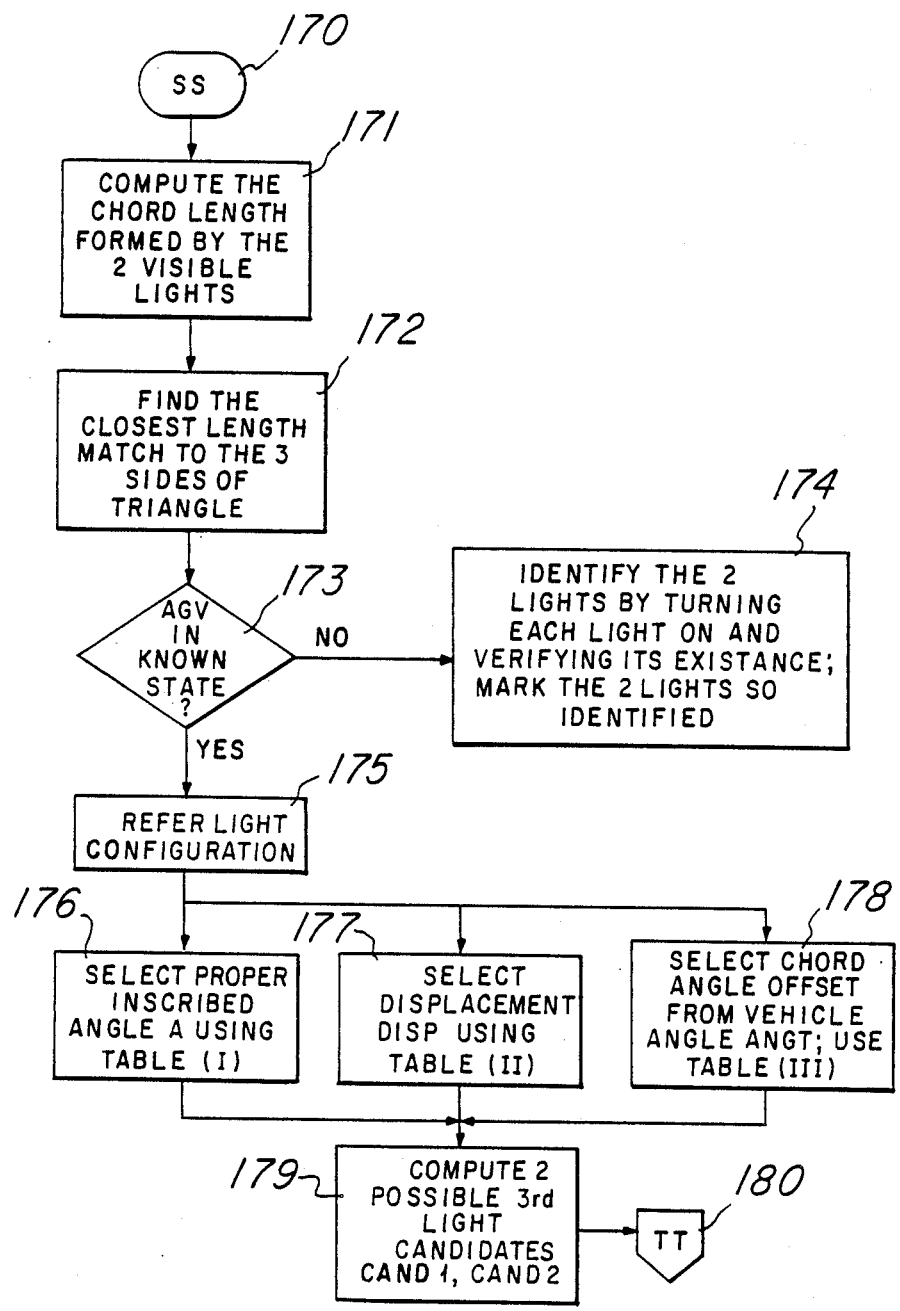
FIG. 20 is a flowchart showing the method the visual navigation system uses to synthesize a third navigation beacon light blob, such as when only two beacons are visible because one or more beacons are blocked.

When AGVs carry large payloads, or when a material-handling mechanism such as a robot is on board, the possibility exists that one or more beacons may be obstructed and, thus, may be invisible to the overhead cameras of the visual navigation system. As shown in FIG. 20, the need for three lights to form a triangle can be satisfied by synthesizing 170 a third light if necessary. When only two lights are visible, the visual navigation system computes 171 the length of the chord formed by the 2 visible lights, finds the closest match 172 with the sides of the AGV's light triangle, and uses look-up tables in memory to select the proper inscribed angle 176, displacement 177, and chord angle offset 178. The system then computes 179 two possible candidates for the third light.

Figure 21:
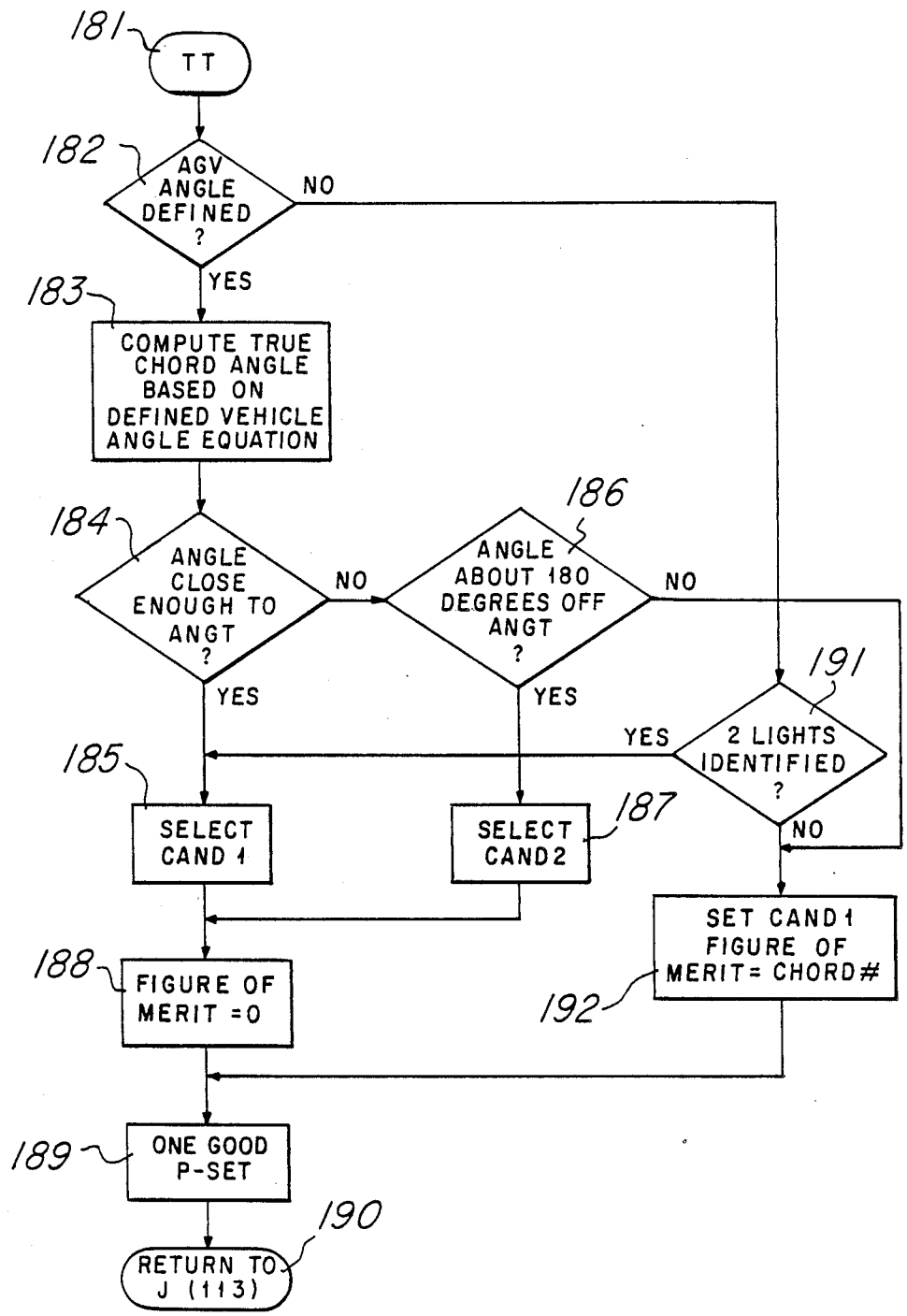
FIG. 21 is a flowchart showing the method the visual navigation system uses to select the best of two candidates for a third AGV navigation beacon light blob, such as when only two beacons are visible.
Figure 22:
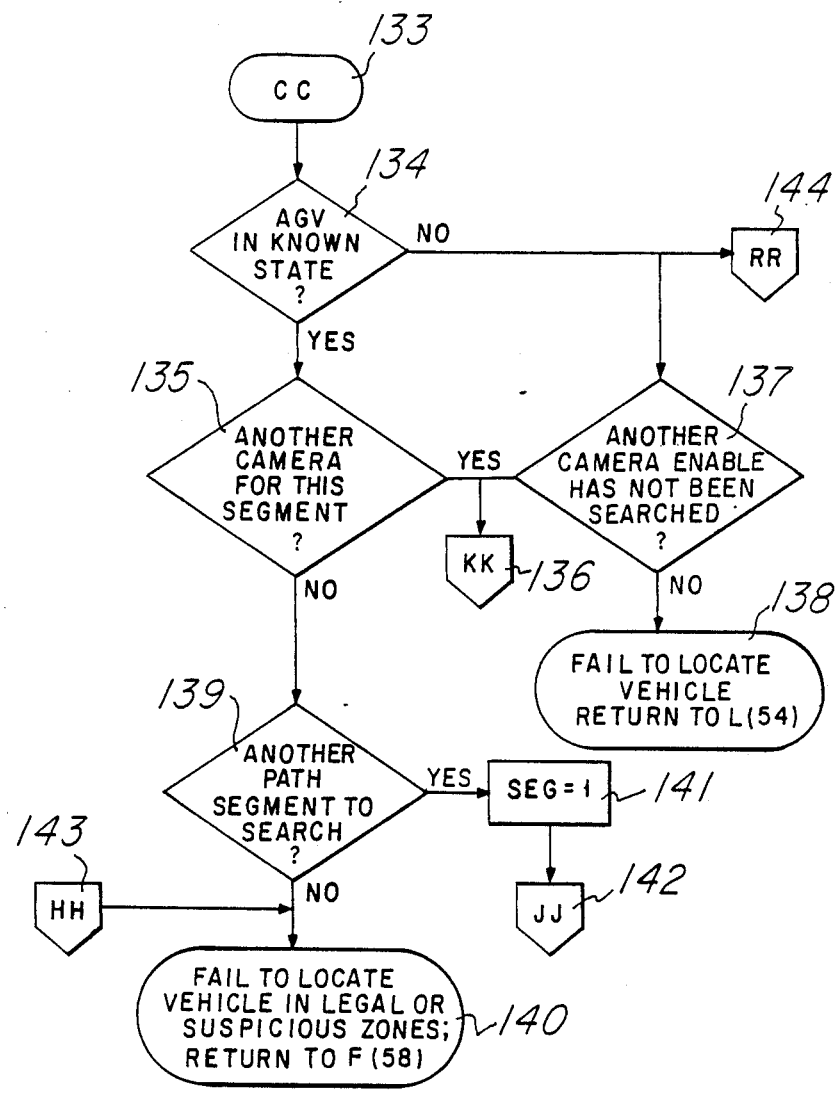
FIG. 22 is a flowchart showing the method the visual navigation system uses to determine which camera to use to search for an AGV.

The visual navigation system selects FIG. 21 at 185 a candidate for the third light position based on the best match between the derived chord angle and the true chord angle 184, which, in turn, is based on the defined AGV angle equation 183. As shown in FIG. 35, the light positions and AGV angle (both real and extrapolated) can be defined by:

Canx1 = light1x + [DISP*CosA]
Cany1 = light1y + [DISP*SinA]
Canx2 = light2x − [DISP*CosA]
Cany2 = light2y − [DISP*SinA]
True_Chord_Angle = ANGT + Veh_Angle
where ANGT is the angle of vector (light2,light1)

-continued

> relative to Veh_Angle
> and Veh_Angle is the vehicle travel angle of this path link The three-light set thus selected gives one good perimeter set, as in FIG. 21 at 189, to use in AGV identification FIG. 15 at 113.

If there is no true chord angle defined, as at 182 in FIG. 21, the image processing system calculates chords which connect the possible pairs of lights. In the case where only two lights are visible, the visual navigation system "creates" two candidates for the third light, as in FIG. 35. It reports the locations of the candidates and sets the figure of merit to the chord number which represents the "known good" chord.

The figure of merit is simply a measure of the confidence of a visual navigation system position update. If the figure of merit is "00" the visual navigation system is certain of its calculations. If the visual navigation system cannot find three lights for an AGV, and the selected synthesized third light is arbitrary (not "confident"), it sets the figure of merit to the chord number of the chord it uses to calculate the AGV's position, indicating its uncertainty.

FIG. 32 shows all possible valid chord numbers (11–16) and their relation to the AGV. As shown in the flowchart in FIG. 30, the autonomous AGV controller recognizes 275 that in the case where the figure of merit is not "00" the visual navigation system is not certain of its choice of lights. In such cases, the AGV's on-board controller (17 in FIG. 6) decides 276–284 whether the visual navigation system has made a logical choice. The AGV's decision is based on the position history in its memory unit. For example, if the visual guidance system 10 reports a choice of candidate which gives an AGV angle 277 greater than 90 degrees different from the AGV angle in previous positions 278, the AGV controller 17 is free to assume that the visual guidance system 10 has erred. When the AGV controller 17 overrides 279 the visual guidance system's choice, it adjusts 280 the angle and position based on data from its previous dead reckoning positions.

There are three possible conditions. In the first 275 (yes), the visual navigation system tells the AGV its position update is certain, so the AGV controller accepts the update.

In the second case, the visual navigation supplies a chord number for the figure of merit (FOM), 276 (yes), which causes the AGV controller to modify the visual position update. In either of these cases, the AGV proceeds with position adjustment or time synchronizing 281, as appropriate. The portion of the servo loop which actually adjusts AGV position and time synchronization is aboard the AGV (each AGV). More detailed information about these processes is included in U.S. patent application Ser. No. 771,432.

In the third case, an update received by the AGV controller includes an invalid chord number (for the figure of merit). In this case 276 (no), the AGV controller rejects 282 the position update, stops moving 283, signals the error 283, and 284 awaits instructions from the system controller.

Determining if Another Camera or Path Segment can be Searched

When the visual navigation system begins operation, it requests a copy of the factory map from the base station. This map includes knowledge of which overhead camera is associated with which node in the path network. During operation, the visual navigation system knowns an AGV's position relative to a node. Therefore, if an AGV is in a known state FIG. 22 at 134, the visual navigation system knows which camera it should use to view an AGV. If the AGV is not in a known state 137, the system can either return an error message 138 or can select the next enabled camera 136. There is also the posibility 135 that an AGV currently is entering or leaving a field of view, in which case the visual navigation system selects 136 the next camera along the current path segment. The final possibility is that the AGV is leaving the current path segment 135, in which case the visual navigation system either 139 returns an error message 140 or selects the next path segment to search 141.

Checking AGV Location Relative to Path Zones

Figure 24:
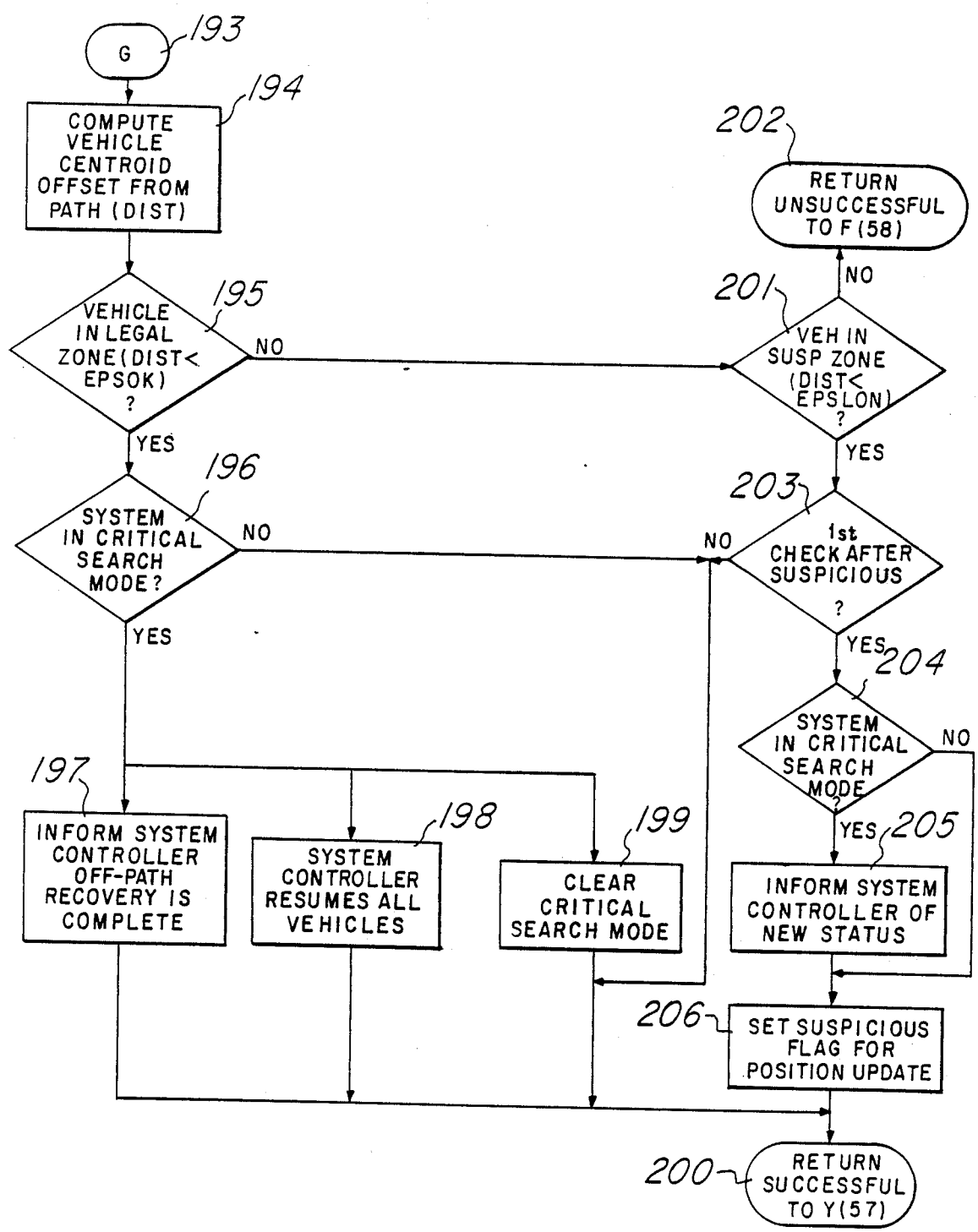
FIG. 24 is a flowchart showing the method the visual navigation system uses to check an AGV's location relative to the zones of allowable travel in a path segment.
Figure 25:
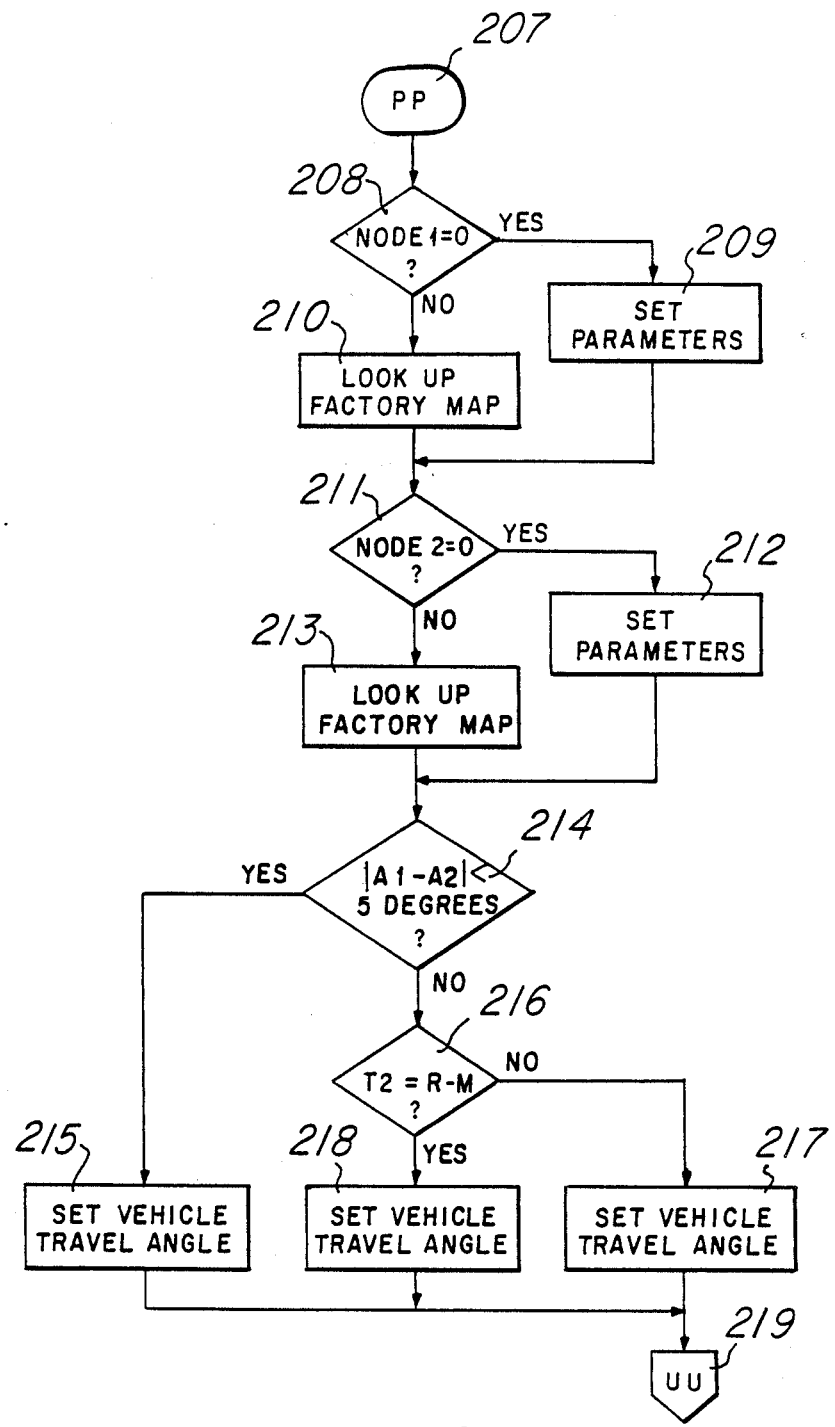
FIG. 25 is a flowchart showing the method the visual navigation system uses to define travel path segments.

The visual navigation system determines a target AGV's location relative to the factory floor and to the allowable zones of travel in the AGV's path as shown in FIG. 12 at 56, and in FIG. 24 at 193. The zones of travel allow the AGVs to operate autonomously without physical path guides or wires, while providing control and safetyl features to stop an AGV which begins to stray from its intended path.

The first step in determining whether a target AGV is on course is to compute 194 the distance (the offset Dist) between the AGV's center and the travel path. Once this distance is known, it can be compared 195 to the width of the Legal Zone (Dist EPSOK) to determine whether the AGV is in the legal zone. If the AGV is in the legal zone and the system is not doing a critical search 196 for the AGV, the visual navigation system takes no action 200 regarding the AGV. If the target AGV has been off course and has just returned 196 to its intended path, the visual navigation system informs 197 the system controller the AGV is now on course, allowing the system controller to resume travel 198 by all other AGVs. This also clears 199 the critical search mode.

If the target AGV is found 195 to be outside the legal zone, the visual navigation system checks 201 to see whether it is in the suspicious zone. If not, the control program starts a critical search 202 and FIG. 27 229. If the target AGV is in the suspicious zone (Dist EPSLON) 201 there are two possibilities: this is the first time the AGV has been in the suspicious zone, or a subsequent time in the suspicious zone. If this is the first time, if is possible that the AGV has not yet triggered 204 a critical search, in which case the visual navigation system sets a suspicious zone flag 206 and resumes tracking. However, if a critical search already is in progress 204, the visual navigation system reports 205 the AGV as suspicious before proceeding. This is important because the AGV can be going either direction: toward the legal zone (recoveing) or away from the legal zone. On subsequent checks after going into the suspicious zone, the visual navigation system just continues to report AGV position until AGV either enters the legal zone or the critical zone.

This closed-loop sequence of path checking and position reporting provides servo-like control of multiple AGVs without physical connections to the AGVs. Part of the servo loop is optical (the overhead cameras monitoring the AGV beacons as shown in FIG. 3 as items 1 and 2), part is electronic (the control hardware as shown in FIG. 6), and part is communications (the wireless IR transceivers, modems, and message switcher as shown in FIGS. 5 and 6). The control programs provided an analog of the wire in traditional servo systems: they "connect" the various elements of the servo loop together.

Updating an AGV's Position

Once a target AGV's position is known (refer now to FIG. 28) at 241, the visual navigation system applies a figure of merit depending upon whether the position is certain 242. As described earlier, setting the figure of merit to "00" 243 indicates this position is certain. Setting 244 the figure of merit to a chord number (the valid numbers are 11–16) informs the AGV that this position is an arbitrary choice of one of two candidates FIG. 20 at 179; hence, the AGV's on-board controller must readjust its position reference based on its position history and the chord number. FIG. 35 illustrates the case where an AGV's orientation may be described by either of two possible positions for a third light. The chord formed between lights 1 and 2 is known, but no third light is visible. The visual navigation system therefore "knows" the two candidate positions (CAND1, CAND2) for the extrapolated third light. The AGV's on-board controller must determine which of the two candidates is best.

Position history is an AGV's record of its position and orientation, stored in a memory unit aboard the AGV. When the visual navigation system reports an "uncertain" position to an AGV, there are two possibilities: either the position is right or it is wrong. In the case where a position update is uncertain because the visual navigation system was forced to base its position update on a single chord, there are two possibilities: either the travel angle matches the previous travel angle (within a small tolerance), or the travel angle is off by about 180 degrees. It is the AGV's on-board controller, not the visual navigation system, which decides whether a position reported as "uncertain" is used.

Figure 28:
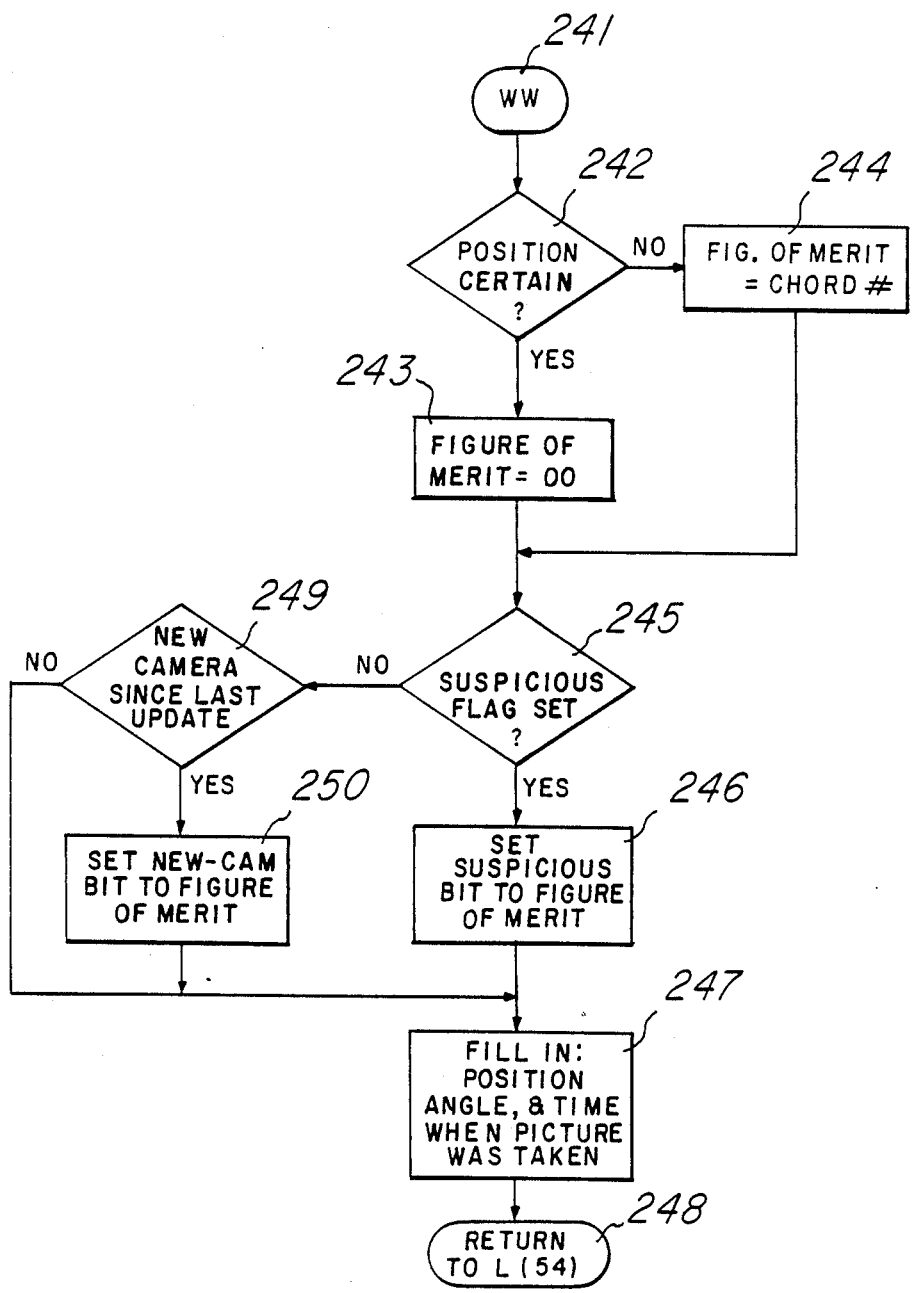
FIG. 28 is a flowchart showing the method the visual navigation uses to update an AGV's position.

In addition to the figure of merit, if an AGV is either in a suspicious zone for the first times as at FIG. 28 step 245 or is entering a new camera's field of view 249, the visual navigation system sets either a suspicious bit 246 or a new-camera bit 250. The navigation system then reports 247 the AGV's position, angle figure of merit, and the time the picture was taken.

Critical Searching (When AGV is Off-Path)

When an AGV strays from its intended path, as indicated in FIG. 27 at 229, the visual navigation system detects the error by noting the position of the AGV center (defined by its beacons) relative to the zones of allowable travel. When the AGV center enters the suspicious zone, the visual navigation system's position update includes a "suspicious bit" which is set for that one update only. This tells the AGV's on-board controller that the visual navigation system identifies it as being in the suspicious zone. Setting the suspicious bit forces an AGV's on-board controller to resynchronize its timer with the visual navigation system to ensure accurate corrections for the following position updates. The visual navigation system does not make AGV travel corrections. Instead, the visual navigation system periodically reports to each AGV its current position (in factory-floor coordinates), its current travel angle, and the time the update picture was taken. An AGV's on-board controller stores this information so that it can compare the current update with the previous one. The on-board navigation program then compares the position change with data from the drive wheel encoders to determine the angle and magnitude of correction needed. In normal operation, these corrections are small.

However, once the AGV "goes critical" as in FIG. 27 at 230 the visual navigation system begins a critical search mode. After this point 231, there are two possibilities: either the AGV had been straying further from its intended path and the visual navigation system already was searching for it 237 in a critical mode; or the current position update is the first time 232 the AGV had been noted far enough off course to be called "critical". In the latter case, the visual navigation system begins a new critical search the next time through the position update loop. It computes a new (wider) suspicious zone 234, which allows the AGV room to try to correct its own error without being stopped by the visual navigation system. It informs 235 the system controller that an AGV is off-course. The system controller then 236 sends an All Stop message to the other AGVs to prevent collisions or personnel hazards. The visual navigation system then checks 233 for an "enable" command from the base station to continue searching for the "lost" AGV.

In the case where an AGV already is "critical", and not just "suspicious", the visual navigation system checks 231 to see whether the current position is the first update since the AGV went off-course. If it is the first time, the visual navigation system tells 232 the system controller the AGV has entered the "dead zone" and checks 233 for any command from the base station. The system controller, visual navigation system, and AGV control programs work together to allow the AGV to attempt to recover as described earlier. However, if the AGV has been critical more than once 231 and remains critical in the current position update, the visual navigation system either returns control 237, 233 to the system controller via the base station or computes 239 new limits for the critical zone, expanding it by 3 inches in every direction to allow the AGV another attempt at self recovery.

In any case, if an AGV is entering into the dead zone after a number of attempts at recovery, the system controller notifies human operators via the operator interface that the AGV needs manual assistance.

What is claimed:

1. A visual navigation system, comprising:
   at least one AGV;
   a plurality of nodes;
   a camera associated with each node for viewing said AGV; and
   a navigation system for generating the position of said AGV from an image formed by one of said cameras;
   wherein said navigation system has knowledge of an AGV route map and a schedule of planned movements for said AGV, and uses such information to predict and select the camera in whose field of view said AGV can be found.

2. The visual navigation system of claim 1, further comprising:
   a uniquely identifiable visual pattern associated with each AGV for unique identification of each AGV by said navigation system.

3. The visual navigation system of claim 2, wherein said visual pattern comprises:
a plurality of lights mounted on each AGV.

4. The navigation system of claim 1, wherein:
said navigation system tracks AGV motion near a given node always using the same camera which is associated with that node.

5. A method of navigating AGVs, comprising:
(a) assigning a plurality of nodes to locations along a route for an AGV such that each node is assigned to a unique location;
(b) positioning a camera near each node for viewing an AGV at or near that node;
(c) using an AGV route map and a schedule of planned movements for said AGV to predict and select the camera in whose field of view said AGV can be found;
(d) using said selected camera to form an image of an identifiable portion of said AGV; and
(e) determining the X-Y position of said AGV from said image.

6. The method of claim 5, wherein:
steps (c) and (e) are carried out by a computer.

7. The method of claim 6, further comprising:
storing said route map and said schedule in computer memory.

8. The method of claim 5, further comprising:
associating a unique camera with a node; and
always using that unique camera when viewing said AGV at or near that node.

9. The method of claim 6, further comprising:
storing a digitized representation of the field of view of said selected camera in random access memory.

10. The method of claim 9, further comprising:
forming a window about said AGV; and
searching only the data within said window for said image.

* * * * *